(12) United States Patent
Chang et al.

(10) Patent No.: US 8,159,191 B2
(45) Date of Patent: Apr. 17, 2012

(54) ADVANCED RECHARGEABLE BATTERY SYSTEM

(76) Inventors: Tsun-Yu Chang, Taichung (TW);
Chun-Chieh Chang, Ithaca, NY (US)

( * ) Notice: Subject to any disclaimer, the term of this patent is extended or adjusted under 35 U.S.C. 154(b) by 116 days.

(21) Appl. No.: 12/785,536

(22) Filed: May 24, 2010

(65) Prior Publication Data

US 2010/0253278 A1 Oct. 7, 2010

Related U.S. Application Data

(63) Continuation-in-part of application No. 12/231,920, filed on Sep. 8, 2008, now Pat. No. 7,777,451, which is a continuation-in-part of application No. 11/805,786, filed on May 24, 2007, now Pat. No. 7,782,013.

(60) Provisional application No. 60/923,747, filed on Apr. 17, 2007, provisional application No. 60/930,646, filed on May 18, 2007.

(51) Int. Cl.
*H02J 7/00* (2006.01)
(52) U.S. Cl. .......................... 320/136; 320/101; 320/118
(58) Field of Classification Search .................. None
See application file for complete search history.

(56) References Cited

U.S. PATENT DOCUMENTS

| | | | | |
|---|---|---|---|---|
| 5,898,291 | A | 4/1999 | Hall | 320/121 |
| 6,060,864 | A * | 5/2000 | Ito et al. | 320/136 |
| 6,064,178 | A | 5/2000 | Miller | 320/117 |
| 6,291,972 | B1 | 9/2001 | Zhang | 320/118 |
| 6,461,764 | B1 | 10/2002 | Nakamura | 429/170 |
| 6,465,986 | B1 * | 10/2002 | Haba | 320/116 |
| 6,873,134 | B2 * | 3/2005 | Canter et al. | 320/118 |
| 7,068,011 | B2 | 6/2006 | Yang | 320/119 |
| 7,400,113 | B2 * | 7/2008 | Osborne | 320/118 |
| 7,508,166 | B2 * | 3/2009 | Ishikawa et al. | 320/118 |
| 7,598,706 | B2 * | 10/2009 | Koski et al. | 320/117 |
| 2004/0164706 | A1 * | 8/2004 | Osborne | 320/116 |
| 2004/0209161 | A1 | 10/2004 | Dubac et al. | 320/135 |
| 2005/0029986 | A1 | 2/2005 | Morgan | 320/118 |
| 2006/0186859 | A1 | 8/2006 | Fujikawa et al. | 320/134 |

* cited by examiner

*Primary Examiner* — Ramy Ramadan
(74) *Attorney, Agent, or Firm* — Kratz, Quintos & Hanson, LLP

(57) ABSTRACT

A rechargeable battery system having a plurality of cells in series circuits for high voltage applications. Cells, cell sets and cell packs in series circuits are protected from overcharging with self-discharging devices. The rechargeable battery system is protected from over-charging and over-discharging and charging is controlled to be resumed by an over-charge/over-discharge printed circuit board or the charger.

19 Claims, 29 Drawing Sheets

1. V> Y, Y=4.0
2. V< Z, Z=2.0, or Z=2.3 (Optional Parameter)
3. X = 3.4, 3.5, or 3.6 (Optional Parameter)

ADVANCED RECHARGEABLE BATTERY SYSTEM

This application is a continuation-in-part of U.S. patent application Ser. No. 12/231,920 filed Sep. 8, 2008, now U.S. Pat. No. 7,777,451 which is a continuation-in-part of U.S. patent application Ser. No. 11/805,786 filed May 24, 2007, now U.S. Pat. No. 7,782,013 which claims priority of U.S. Provisional Applications 60/923,747 filed Apr. 17, 2007 and 60/930,646 filed May 18, 2007 now abandoned.

FIELD OF INVENTION

The present invention is concerned with rechargeable batteries, and in particular with the recharging of rechargeable batteries.

BACKGROUND OF THE INVENTION

1. For batteries to be used for applications such as vehicle starter, electric bikes, electric motorcycles, electric or hybrid vehicles, etc, high voltage is essential owing to the increase of efficiency and the decrease of cost. The increase of voltage requires batteries to be connected in series.
2. Problems associated with batteries in series are:
    a. when one battery has a lower capacity, the capacity of the overall set of batteries is dictated by the capacity of the battery of lower capacity;
    b. if the battery possessing the lower capacity can not be charged to full capacity during charging, the performance of the entire battery set will be degraded owing to the lower capacity battery. This is known in the art as cell imbalance;
    c. the lower capacity of one specific battery can be caused by either high self discharge or defects during battery production.
3. Conventional ways to solve the cell imbalance problem are:
    a. sorting the batteries in order to avoid inconsistency of the batteries to be connected in series;
    b. charging the batteries separately (e.g. U.S. Pat. No. 6,586,909), in order to overcome the problems mentioned above, however, low voltage is required for charging each battery to full (for example, the lithium iron battery is charged to 3.65V) and this low voltage charging is not energy efficient owing to conversions from normal high voltage AC power source to low voltage DC power.

Most prior art systems and methods utilized in making the batteries balanced during charging use complicated circuitry to detect and balance the uncharged batteries (e.g. U.S. Pat. No. 7,068,011, U.S. Pat. No. 7,061,207, U.S. Pat. No. 6,882,129, U.S. Pat. No. 6,841,971, U.S. Pat. No. 6,825,638, U.S. Pat. No. 6,801,014, U.S. Pat. No. 6,784,638, U.S. Pat. No. 6,777,908, U.S. Pat. No. 6,700,350, U.S. Pat. No. 6,642,693, U.S. Pat. No. 6,586,909, U.S. Pat. No. 6,511,764, U.S. Pat. No. 6,271,645).

Rechargeable batteries are becoming more and more important nowadays for wide range of applications other than conventional consumer electronics such as cell phone or lap top computers owing to their remarkable capability in power, enhanced cycle life, and the environmental benign nature. The major reason responsible for this change is that rechargeable batteries are becoming more reliable with better cycle life that allows people to start constructing bigger battery systems for heavier duty applications such as home energy saving systems, or even electric vehicle applications. However, with the increase in size meaning more battery cells being connected in series and parallel, the service life of the resultant battery system becomes unpredictable or even unreliable. One example is the battery cells constructed using the previously patented lithium iron phosphorous oxide ($LiFe_{(1-x)}M_xP_{(1-x)}O_{2(2-x)}$) material as the cathode. Although the single battery performs 1000 cycles easily with more than 80% capacity remaining, the increase in size (with more battery cells connected in series and parallel) could exhibit service life of the whole battery system ranging from several tens of cycles to thousands of cycles. The key to the cycle life enhancement is the capacity balance of battery cells which can be implemented during every time charging. From this perspective, the balance of battery cells is very much dependent on collaborative control being implemented on the battery cells and the charging method being utilized. In the present invention, a battery system is introduced by describing proper constraints and controls on battery cells and the charger or charging system that ensures the best implementation of the battery cells balance that leads to a prolonged cycle life of the whole battery system.

OBJECT OF THE INVENTION

It is an object of the present invention to provide a battery system containing battery packs and charger (or charging system) that renders the battery packs possessing outstanding performance with prolonged cycle life. In this disclosed battery system, no constraints of constant voltage or constant current charge is needed, as is necessary for conventional lithium ion batteries.

SUMMARY OF THE INVENTION

The present invention is a rechargeable battery system having a plurality of cells and a charging means for charging the rechargeable battery system. The rechargeable battery system has a plurality of cells electrically connected to form a rechargeable battery system; a self-discharge voltage measuring means for continually measuring a self-discharge voltage and a corresponding self-discharging means, both connected in parallel to at least one of a cell in a series circuit, a cell set in a series circuit and a cell pack in a series circuit; an over-charge voltage measuring means for continually measuring an over-charge voltage across at least one of a cell in a series circuit, a cell set in a series circuit and a cell pack in a series circuit; a charging means connected in series with the rechargeable battery system for charging all of the cells of the rechargeable battery system; a system voltage measuring means for continually measuring a system voltage across the charging means; a limiting means for limiting the charging current of the rechargeable battery system; and a controlling means for controlling the rechargeable battery system. Operation of the rechargeable battery system is such that:

(a) during charging, if the self-discharge voltage measured by any one of the self-discharge voltage measuring means is ≧ a preset self-discharge voltage, then, the corresponding self-discharging means operates until the measured self-discharge voltage is less than the preset self-discharge voltage, then, the corresponding self-discharging means does not operate; and (b) during charging, if any of the measured over-charge voltages is > a preset overcharge voltage, then, the charging current to the rechargeable battery system is limited, then, when all the measured over-charge voltages are ≦ a preset first resume voltage, then, the charging current to the rechargeable battery system is not limited; and (c) during charging, if the measured system voltage is > a preset overall voltage, then, the charging current to the rechargeable battery system is limited, then, when the measured system voltage is ≦ a preset second resume voltage, then, the charging current to the rechargeable battery system is not limited; and (d) during charging, if the period of time for the charging current to the rechargeable battery system being limited is > a preset system period of time, then, the charging current to the rechargeable battery system is not limited.

DESCRIPTION OF THE DRAWINGS

The invention will become more readily apparent from the following description thereof shown, by way of example only, in the accompanying drawings, wherein.

DETAILED DESCRIPTION OF THE INVENTION

The present invention is especially important for resolving the problems caused by batteries connected in series. A cell imbalance problem during charging can be alleviated by creating a device and methods that allows the leakage of current (energy) from the batteries being-charged. Instead of using very expensive devices or ways to prevent over-charging, to achieve battery equalization, as found in prior art devices and methods, the present invention uses a method and device that reduces the current being provided to a battery in the series circuit that is being over-charged. Such method and device can be implemented for each battery or battery set or battery pack being connected in series. For a single battery unit, it can be called "a battery" or "a cell". The terminology "battery set" or "cell set" used throughout the specification means a plurality of batteries connected in parallel, or series, or parallel-series, or series-parallel. The terminology "battery pack" or "cell pack" used throughout the specification means a plurality of battery sets connected in parallel, or series, or parallel-series, or series-parallel. The terminology "assembly" used throughout the specification means a battery (or a cell), a battery set (or a cell set), or a battery pack (or a cell pack) accompanied with a means for self-discharge of the battery(s) (or cell(s)), battery set(s) (or cell set(s)) or battery pack(s) (or cell pack(s)) when the battery(s) (or cells(s)) is (are) being over-charged In the present invention a battery or batteries self-discharge when over-charged. Since each battery, battery set, or battery pack are provided with a "self-discharge" means, when voltage reaches a preset parameter during charging, or even after charging, a cell balance problem can be eliminated.

Figure 1A:
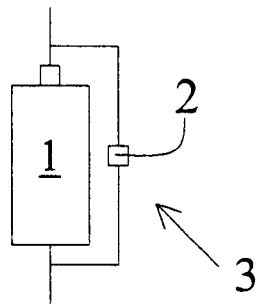
FIGS. 1a-e are schematic illustrations of various embodiments of battery assemblies of the invention.
Figure 1B:
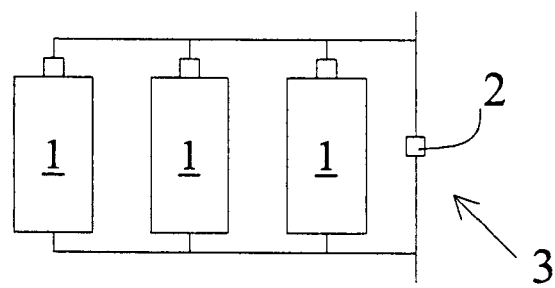
Figure 1C:
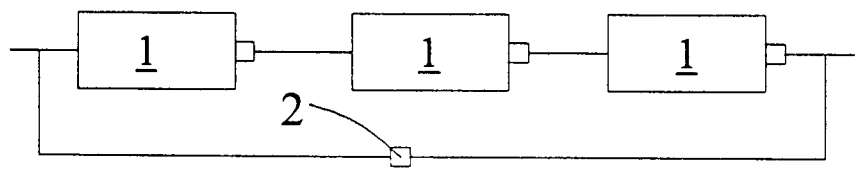
Figure 1D:
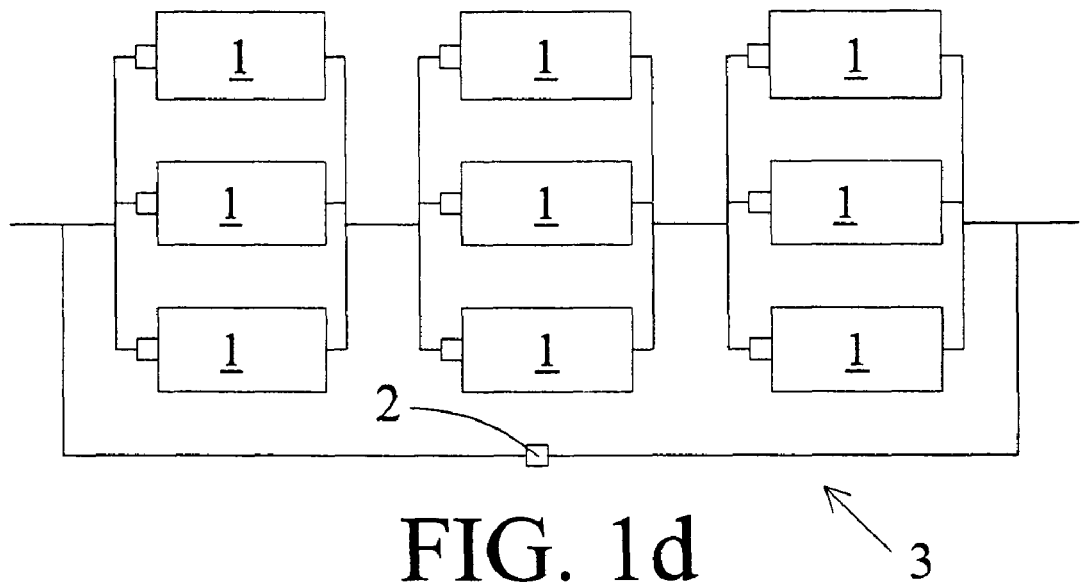
Figure 1E:
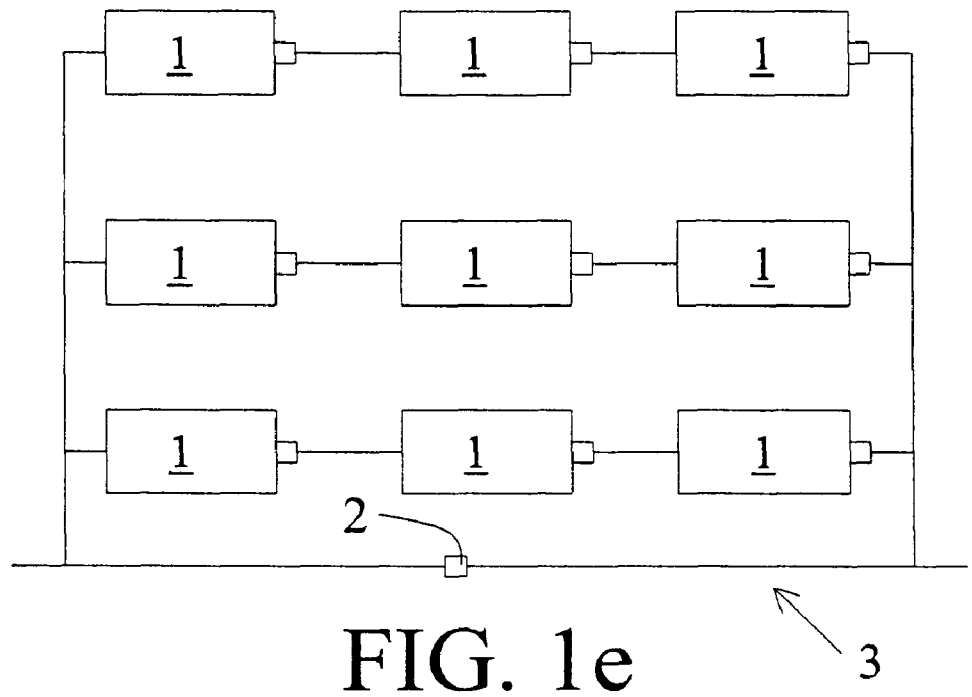

FIG. 1(a) shows the structure of a "battery assembly". FIG. 1(b) shows the structure of a "parallel battery set assembly"; FIG. 1(c) shows the structure of a "series battery set assembly"; FIG. 1(d) shows the structure of a "parallel-series battery set assembly"; and FIG. 1(e) shows the structure of a "series-parallel battery set assembly". These assemblies are the basic units for use in providing the battery pack. In these figures, as well as in the remaining figures, an individual rechargeable battery is indicated at 1, and a circuit for self-discharging the rechargeable battery(s) is indicated at 3.

Figure 2A:
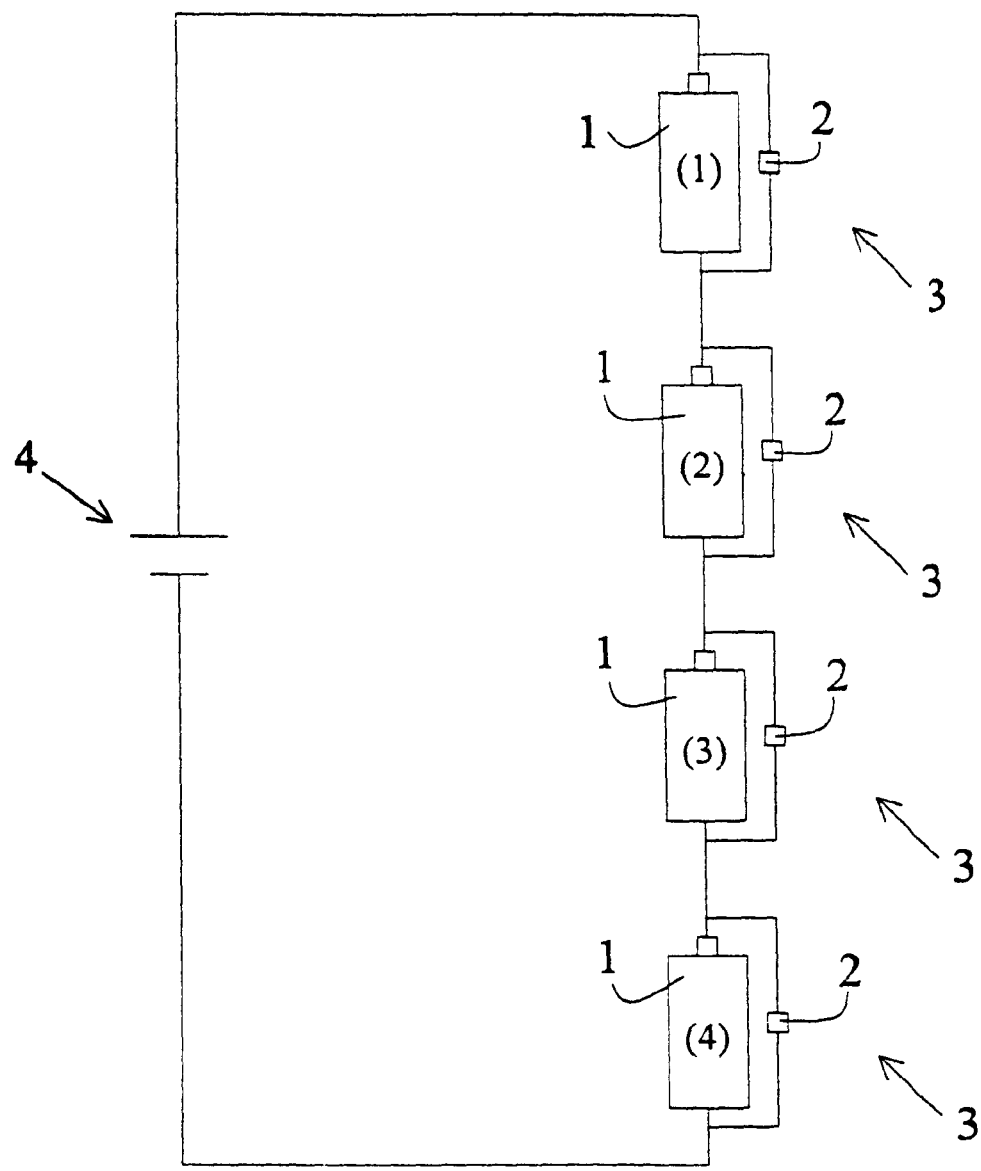
FIG. 2a is a schematic illustration of a battery assembly of the invention with an enlarged drawing of a self-discharging circuit of the invention.
Figure 2A:
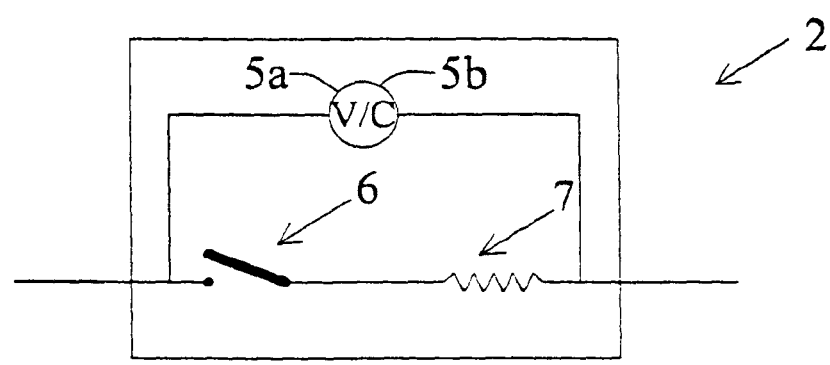
Figure 2B:
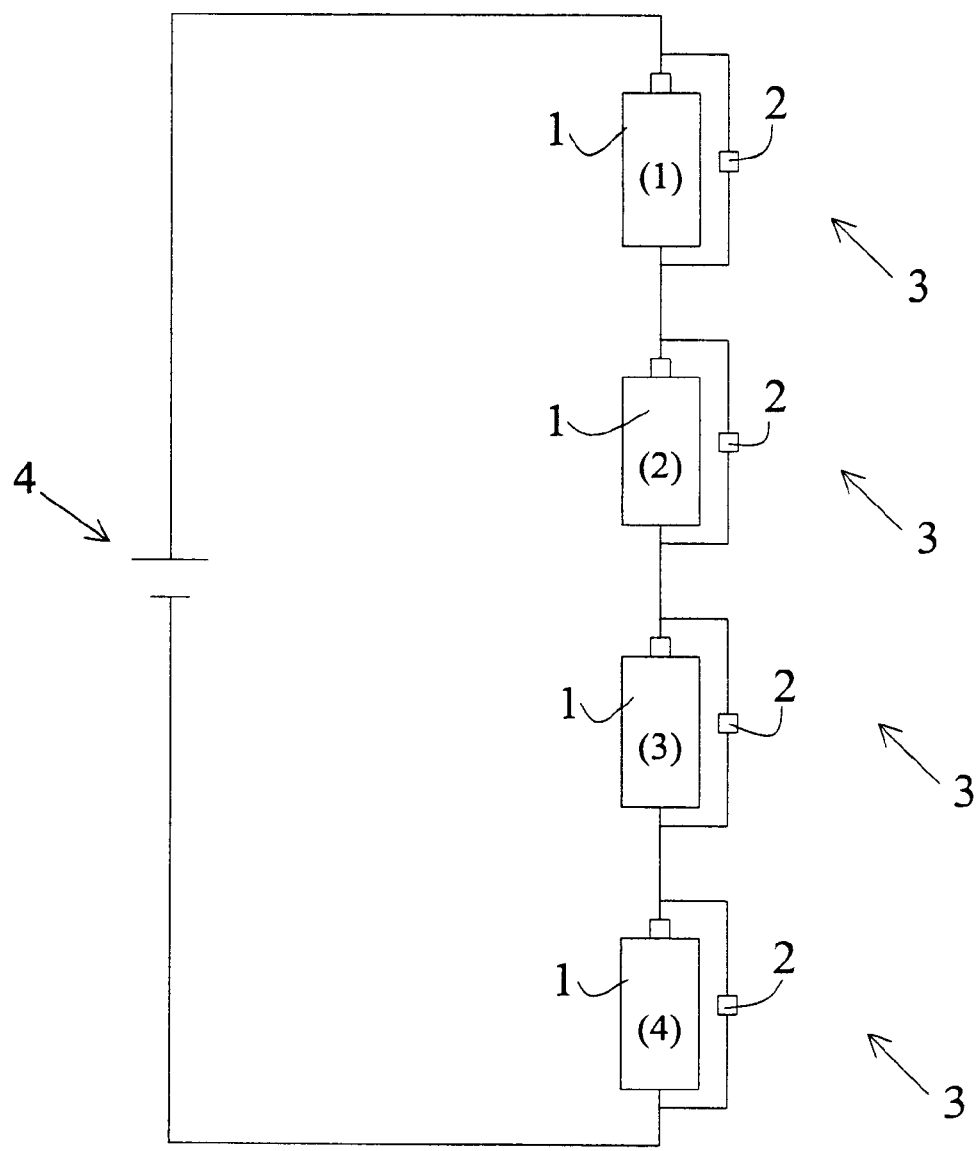
FIG. 2b is a schematic illustration the battery assembly of the invention with an enlarged drawing of another embodiment of a self-discharging circuit of the invention.
Figure 2B:
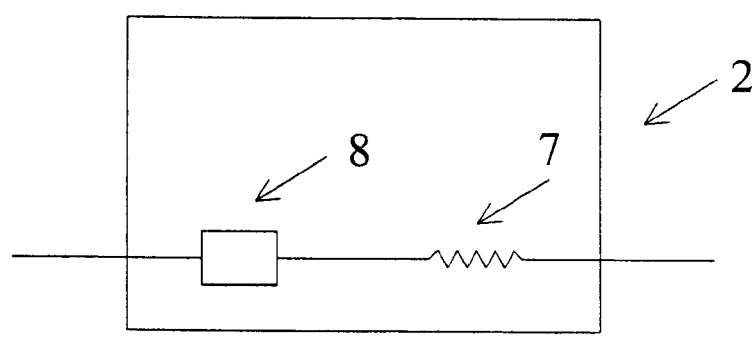

The present method of solving the cell imbalance problem is shown in FIG. 2(a). As indicated in FIG. 2(a), each battery is connected with a device 2 in parallel with the battery. Such device is comprised of a switching element 6, a resistance element 7, a voltage-detecting element 5a, and a switching element controller 5b that opens or closes the switching element 6. The voltage-detecting element detects the voltage of the battery and along with the switching element controller controls the "opened" or "closed" state of the switching element. The switching element, resistance element, voltage-detecting element and switching element controller can be disposed on a printed circuit board. However, since a transistor can function as a combination of a voltage-detecting element, controller, switching element, and a resistance element, the device shown in FIG. 2(a) can be replaced by a transistor, or a plurality of transistors connected in parallel (for adjusting the resistance). Other possibilities are one transistor 8 connected with a resistor 7 in series as shown in FIG. 2(b). In the case of the transistor and resistor connected in series as indicated in FIG. 2(b), the resistance of the resistor should be small in order to minimize the voltage drop caused by the resistor thus affecting the voltage detection of the transistor. The configuration of FIG. 2(b) can also be applicable to diodes such as LEDs, or a printed circuit board consisting of the switching element and the controller only.

When batteries are charged, if the voltage of one of the batteries is above a preset upper limit, the switching element of the device electrically connected in parallel to the battery closes, therefore allowing current to flow through the resistor.

Thus, the charging current for the battery that passed the preset upper limit voltage decreases, due to the presence of the device connected in parallel to the battery. Such decrease is shown in Example 1, below. Under such condition, other batteries are charged in a normal current flow but the one that passed the upper voltage limit has a decreased charging action. This is a basic mechanism of the invention for the prevention of battery over-charging. It should be mentioned that the resistance element can be any electronic component that possesses a satisfactory resistance. For example, a light bulb can be used as a source of resistance.

Figure 3:
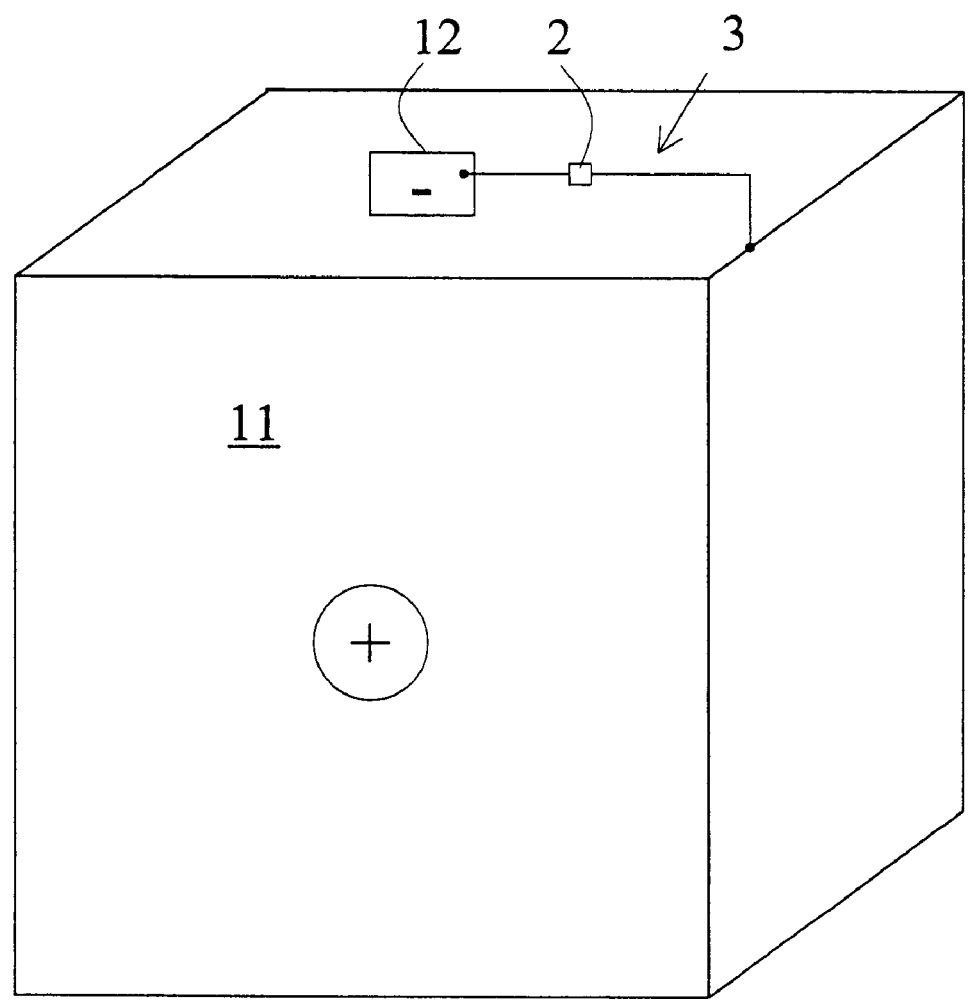
FIG. 3 is a schematic illustration of the battery assembly of the invention having the self-discharging circuit disposed on a case of the battery.

The elements of the device can be on a semiconductor chip 2, which can be disposed anywhere close to the battery. FIG. 3 shows one possibility of the semiconductor chip 2 being built-in on the lid of a case of a battery. Also, for example, the chip can be disposed between the cathode (the case) 11 and the anode (the negative terminal) 12. Also, the chip can be placed inside the battery case.

The resistor can be a variable one if further precise control of the resistance is necessary. Details of the current change for each battery during charging are further described below:

EXAMPLE 1

Theoretical Demonstration of how Cell Equalization can be Achieved

Assumptions:
1. Four battery assemblies are connected in series as indicated in FIG. 2(*a*).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. For each battery assembly, a resistor of 1.0 Ohm is connected parallel to the battery.
5. A power supply of 15V is applied to the four battery assemblies connected in series.

Calculation Case 1 (when Paralleled Resistors are all Open):
During charging of the four battery assemblies, the voltage of each battery can be represented as:
Battery (1): $V_1=Vo_1+I_1R_1$, $V_1$ is the voltage of the battery (1) during charging, $Vo_1$ is the open circuit voltage of battery (1), $I_1$ is the current passing through battery (1) and $R_1$ is the internal resistance of the battery (1).
Battery (2): $V_2=Vo_2+I_2R_2$,
Battery (3): $V_3=Vo_3+I_3R_3$,
Battery (4): $V_4=Vo_4+I_4R_4$,
Since no other resistors are connected, $I_1=I_2=I_3=I_4=I$
$15=(V_1+V_2+V_3+V_4)=(Vo_1+Vo_2+Vo_3+Vo_4)+I(R_1+R_2+R_3+R_4)$
$15-(Vo_1+Vo_2+Vo_3+Vo_4)=I(R_1+R_2+R_3+R_4)$
$15-3.3-3.6-3.3-3.3=I(0.005+0.01+0.005+0.005)$
I=60 Amp—The current that passes through each battery
Calculation Case 2, (when the Paralleled Resistor Circuit is Closed for Battery (2)):
Assume I' is the current passing through the resistor and R' is the resistance of the resistor.
Then,
$V_2=I'R'$, $I'=V_2/R'$
$V_2=Vo_2+I_2R_2$,
Considering the current balance: $(I'+I_2)=I_1=I_3=I_4=I$
So,
$V_2=Vo_2+(I-I')R_2=Vo_2+(I-V_2/R')R_2$
Rearrange, then we get
$V_2=(Vo_2+IR_2)/(1+R_2/R')$ Thus,
$15=(V_1+V_2+V_3+V_4)=(Vo_1+Vo_3+Vo_4)+I(R_1+R_3+R_4)+(Vo_2+IR_2)/(1+R_2/R')$
So,
I=61.672 (A),
$V_2=(Vo_2+IR_2)/(1+R_2/R')=4.175$ (V),
$I'=V_2/R'=4.175$ (A),
$I_2=I-I'=57.497$ (A)
If we substitute a resistor of 10 Ohm, then
I=60.168 (A),
$V_2=Vo_2+(I-V_2/R')R_2=4.1975$ (V),
$I'=V_2/R'=0.4198$ (A),
$I_2=I-I'=59.748$ (A)

Conclusions from the Calculations:
1. With regards to battery assembly of FIG. 2(*a*), when the switch of the resistor in the parallel circuit is closed, current flows through the resistor, and the charging current for battery (2) is decreased.
2. While the switch of the paralleled resistor circuit is closed for the battery assembly of FIG. 2(*a*), the charging current for other batteries (1, 3, 4) is increased.
3. The resistance of the resistor dictates the magnitude of the current decrease for battery (2). The smaller the resistance, the bigger the magnitude of current decrease.
4. Thus, the idea of incorporating a resistor with each battery connected in series is effective in balancing the capacity of all batteries by decreasing the charging current of the battery that has a higher capacity, and by increasing the charging current of the other batteries that have a lower capacity.
5. It is clear that the resistor connected in parallel with the battery should possess satisfactory cell balancing function. Any electronic devices or components that satisfy the function of voltage sensing and providing the source of resistance are within the focus of the present invention.

EXAMPLE 2

Theoretical Calculation Demonstrating a Method of Charging a Battery Assembly

Assumptions:
1. Four battery assemblies are connected in series as indicated in FIG. 2(*a*).
2. Batteries (1), (3), (4) have internal resistance of 5 mOhm, battery (2) has an internal resistance of 10 mOhm.
3. Batteries (1), (3), (4) have open circuit voltage of 3.3V, battery (2) has an open circuit voltage of 3.6V.
4. Batteries (1), (2), (3), and (4) are subjected to a constant current charge. The current is 2 A.
5. For demonstration purpose, the battery being investigated, battery (2), a resistor of 1.0 Ohm is connected parallel to the battery and the circuit switch is closed.

Calculations:
Considering the current balance: $(I'+I_2)=I_1=I_3=I_4=2$ (A)
$V_2=Vo_2+(I-I')R_2=Vo_2+(I-V_2/R')R_2$
Rearrange, then we get
$V_2=(Vo_2+IR_2)/(1+R_2/R')$
Substituting $Vo_2=3.6$ (V), I=2 (A), $R_2=0.01$ Ohm, R'=1 Ohm
We get:
$V_2=3.5842$ (V)
$I'=V_2/R'=3.5842$ (A),
$I_2=I-I'=2-3.5842=-1.5842$ (A)<0

Conclusions from the Calculations:
1. The battery that is over-charged will undergo discharging when the circuit current (I) is less than the current that passes the resistor (I'). That is, (I−I'<0).
2. When batteries being over-charged undergo discharge, cell balance can be achieved.
3. By combining the calculation results shown in Example 1 and 2, it can also be concluded that the cell balance charging method can be implemented as either a constant voltage mode (but the charging time required should be longer than the time required for the condition of I<I'), or a constant current mode by passing a current (I) that is less than the current that passes the resistor (I').
4. It can further be concluded that the charger can be designed to have two modes for charging. One mode is the normal constant current/constant voltage charge mode for a battery system's normal use (end of charge executed by setting a certain charging time). The other mode is the cell balance mode (constant current charging) that can be used when a battery system possesses less capacity than their normal use.

EXAMPLE 3

A Battery Pack and a Battery System

Figure 9:
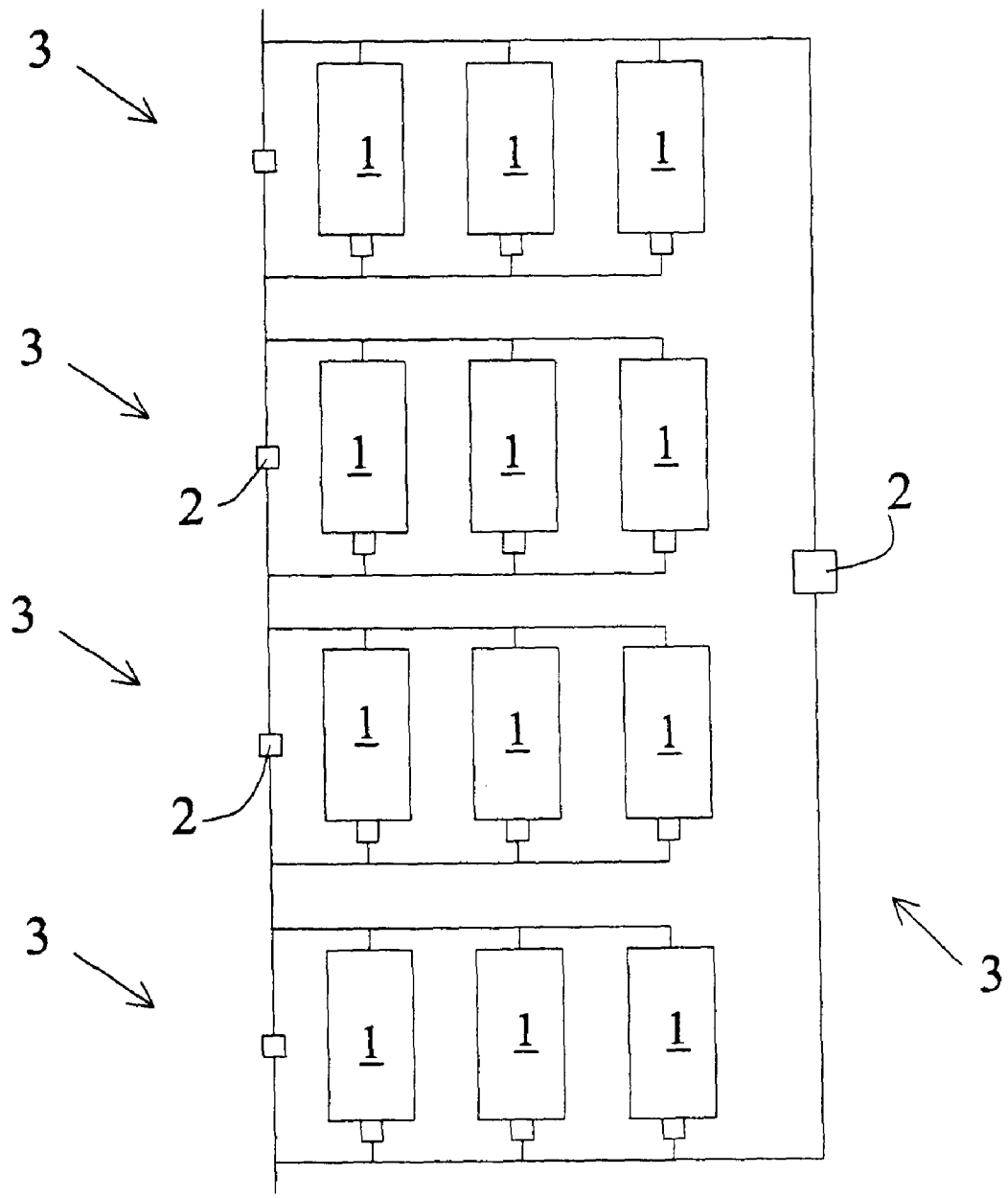
FIG. 9 is a schematic illustration of a battery pack assembly having battery assemblies of the invention.

As mentioned above, a battery pack can be comprised of battery sets, or battery set assemblies as shown in FIG. 1(a)-(e). In the present invention, a battery pack may also connect with a parallel circuit containing a switching element, a voltage-detecting element, a controller, and a resistance element to form a "battery pack assembly". The possible structures of battery packs constructed using battery set assemblies are shown in FIGS. 5(a)-(e), FIGS. 6(a)-(e), FIGS. 7(a)-(e), and FIGS. 8(a)-(e). These figures represent the five unit structures shown in FIGS. 1(a)-(e) being connected in various circuit arrangements. In series (FIGS. 5(a)-(e)), in parallel (FIGS. 6(a)-6(e)), in parallel-series (FIGS. 7(a)-7(e)), and in series-parallel (FIGS. 8(a)-8(e)). Each of the cases shown in FIGS. 5, 6, 7, and 8 can again be combined with a parallel circuit containing the switching element, the controller, the voltage-detecting element and the resistance element to form a "battery pack assembly". An example of a "battery pack assembly" is shown in FIG. 9

Figure 10:
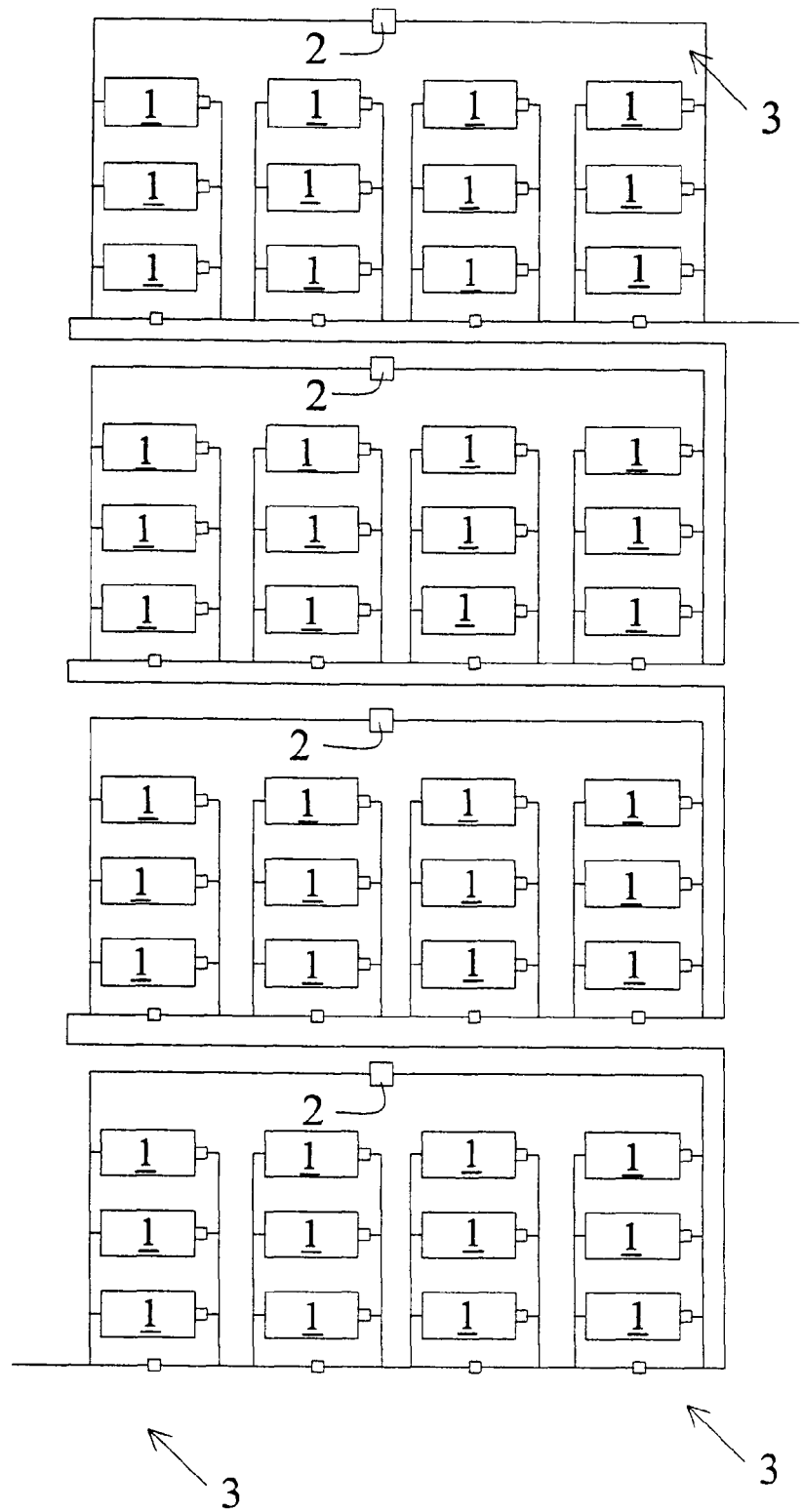
FIG. 10 is a schematic illustration of a battery system having battery assemblies of the invention, as discussed in example 3.

Similar to the case as a battery pack that is comprised of battery sets or battery set assemblies, a battery system is comprised of battery packs or battery pack assemblies. Again, the possible structures of a battery system constructed using battery pack assemblies can be in series, parallel, parallel-series, and series-parallel. An example of a "battery system" is shown in FIG. 10.

One practical case is described here, that is an example of the battery system for an electric motorcycle. Referring to FIG. 10, a typical electric motorcycle uses a battery system having 53V, and 40 Ah. The battery system is comprised of four battery packs (13.3V) connected in series. Each of the battery packs consists of four lithium iron battery sets (3.33V) connected in series. And, each of the battery sets consists of four 10 Ah batteries connected in parallel. In this case, the best structure of the battery system is the utilization of battery pack assemblies and the battery set assemblies, as building blocks for the battery system. In such arrangement, over-charging of battery packs and over-charging of battery sets can be prevented. If the battery system is constructed using battery pack assemblies but the pack assemblies are constructed by battery sets only, some possible over-charging in the battery set may occur after long time cycling. If the battery system is constructed using battery packs only and the battery packs are constructed using battery sets rather than battery set assemblies, cell imbalance accompanied with over-charging during charging can occur.

EXAMPLE 4

A Preferred Electric Power Supply System

Figure 4:
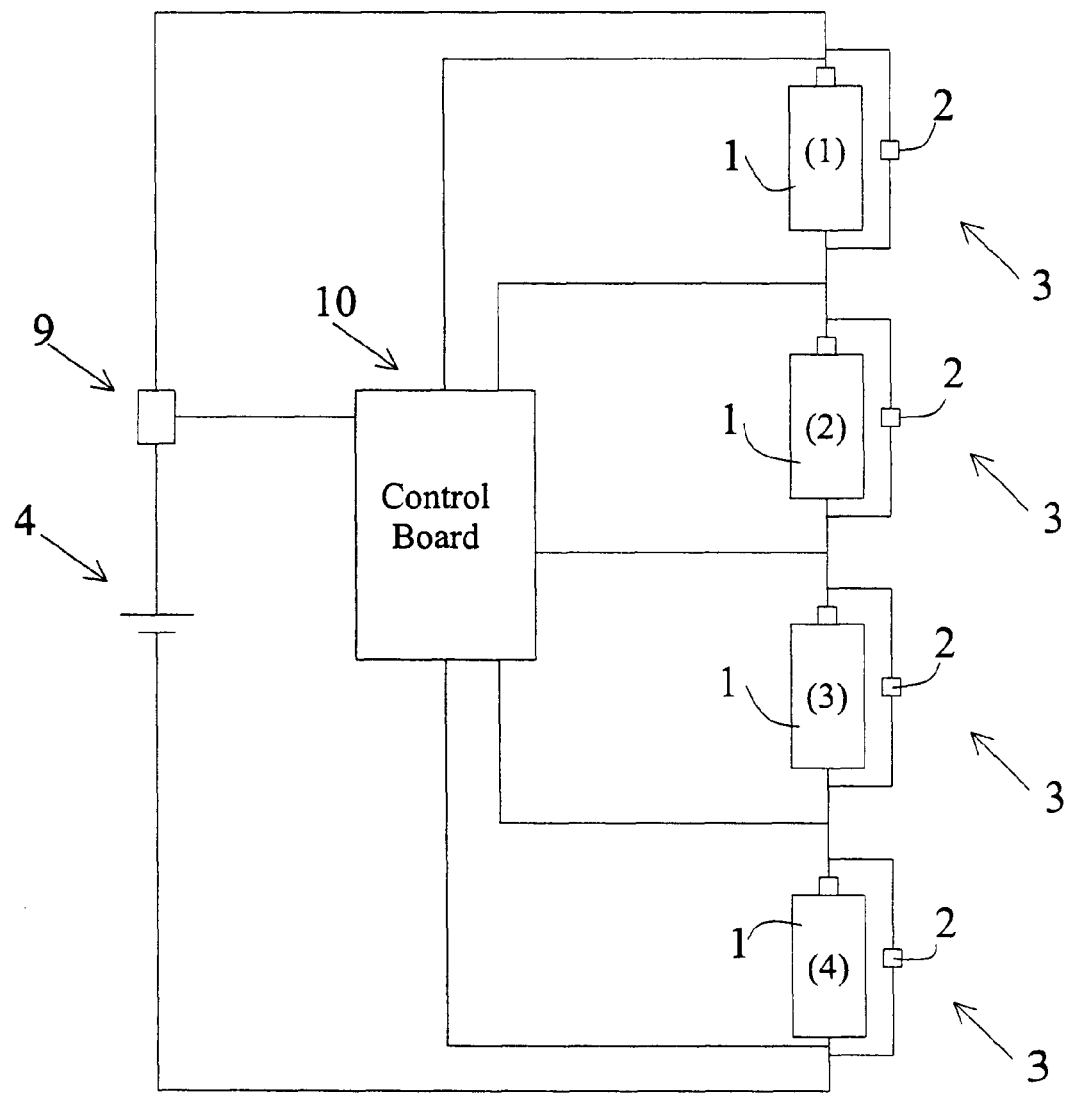
FIG. 4 is a schematic illustration of an electric power supply system having battery assemblies of the invention.
Figure 5A:
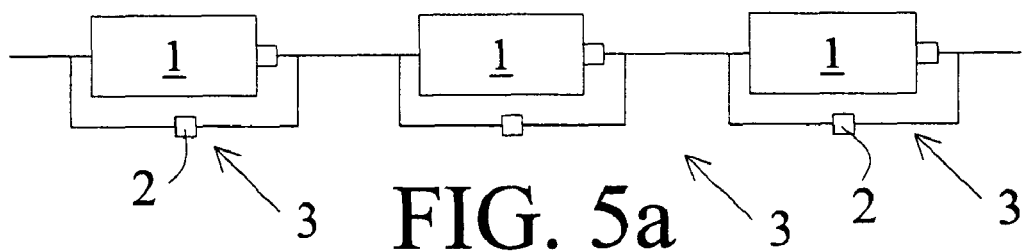
FIGS. 5a-e are schematic illustrations of battery packs having battery assemblies of the invention
Figure 5B:
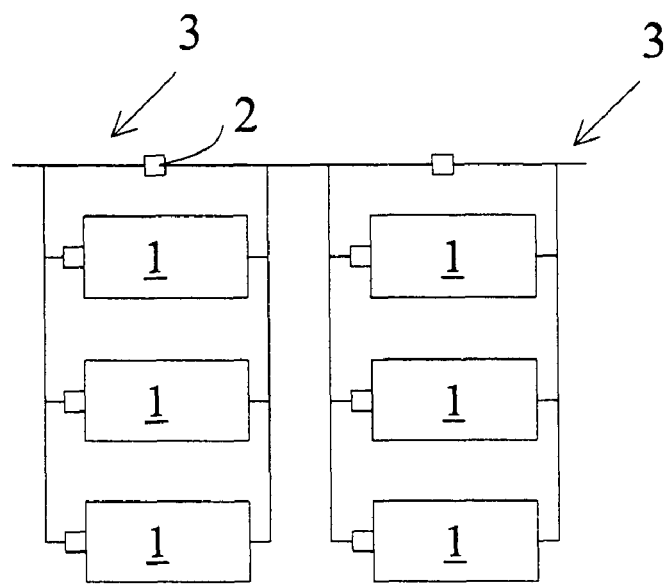
Figure 5C:
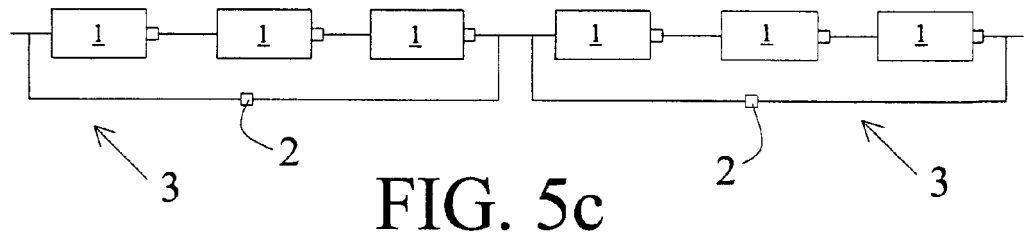
Figure 5D:
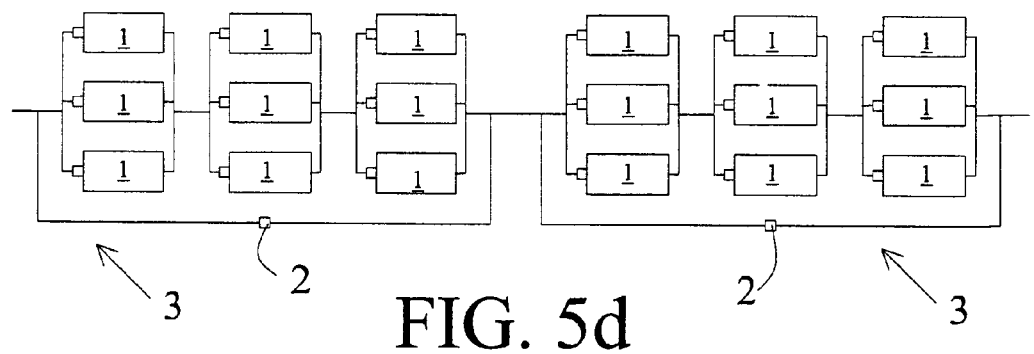
Figure 5E:
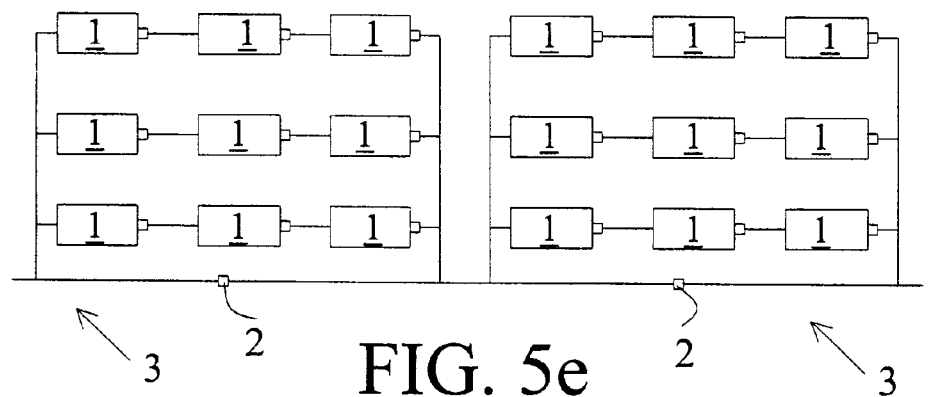
Figure 6A:
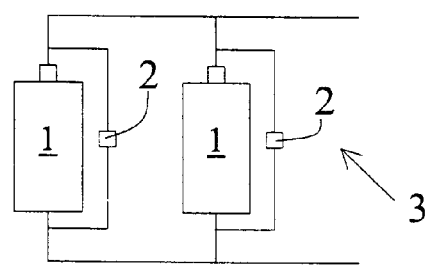
FIGS. 6a-e are schematic illustrations of battery packs having battery assemblies of the invention differing from those of FIGS. 5a-e.
Figure 6B:
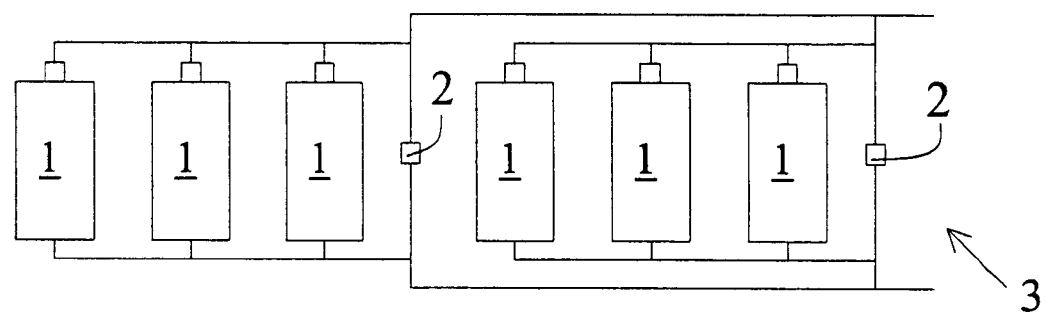
Figure 6C:
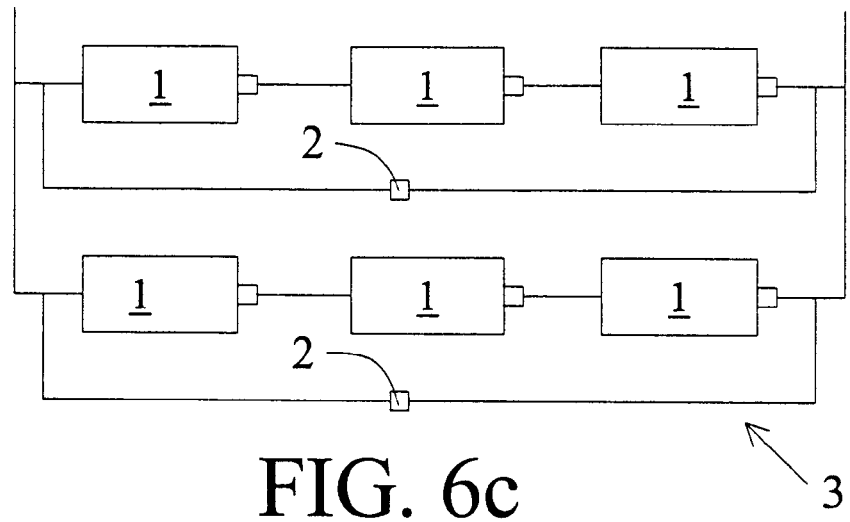
Figure 6D:
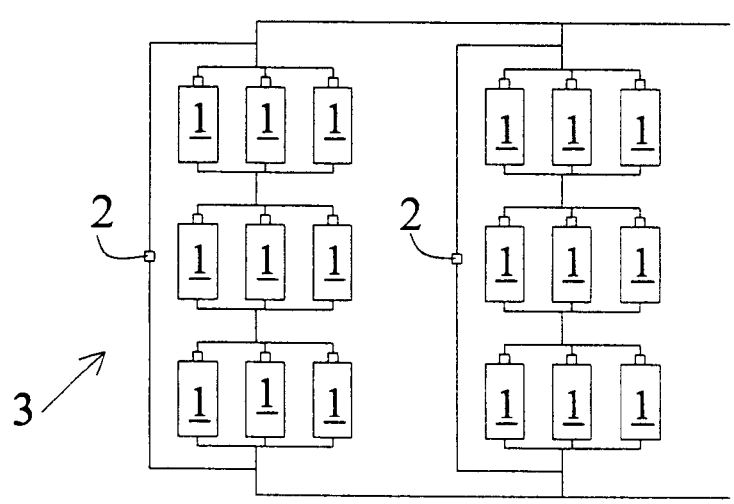
Figure 6E:
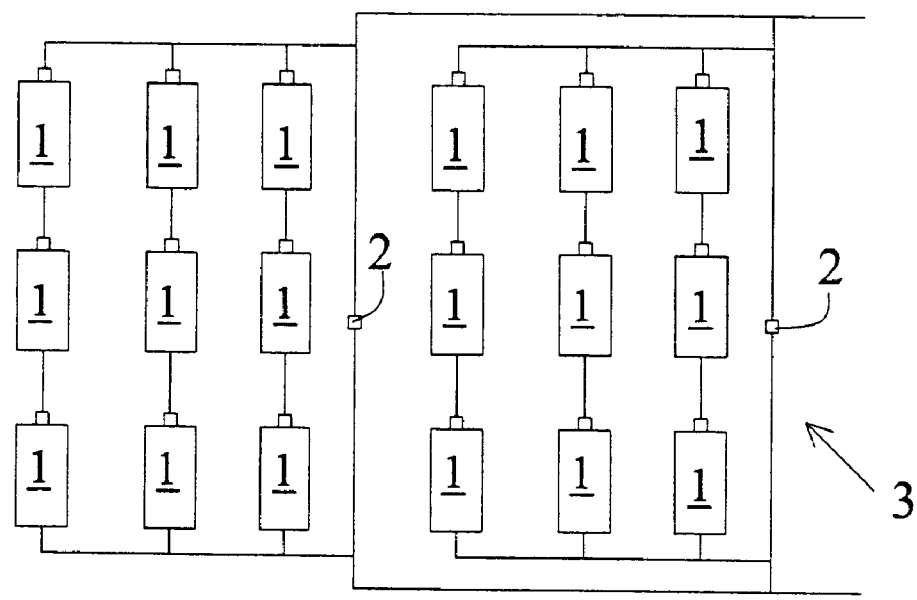
Figure 7A:
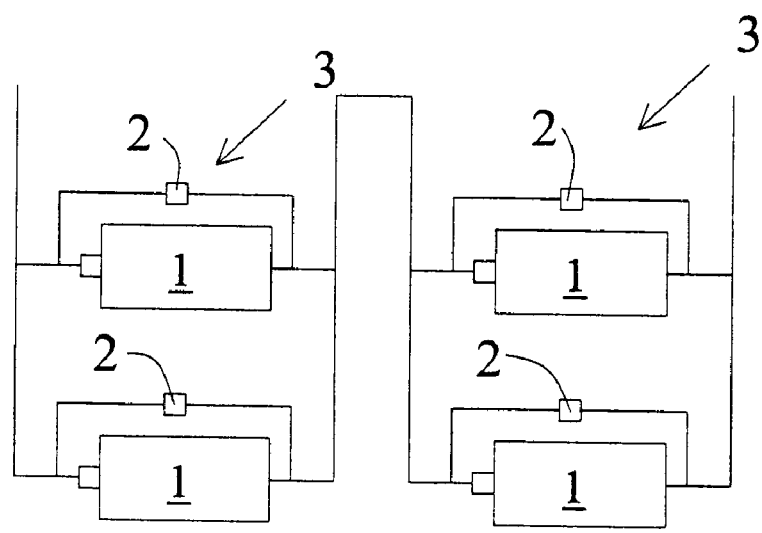
FIGS. 7a-e are schematic illustrations of battery packs having battery assemblies of the invention differing from those of FIGS. 5a-e and 6a-e.
Figure 7B:
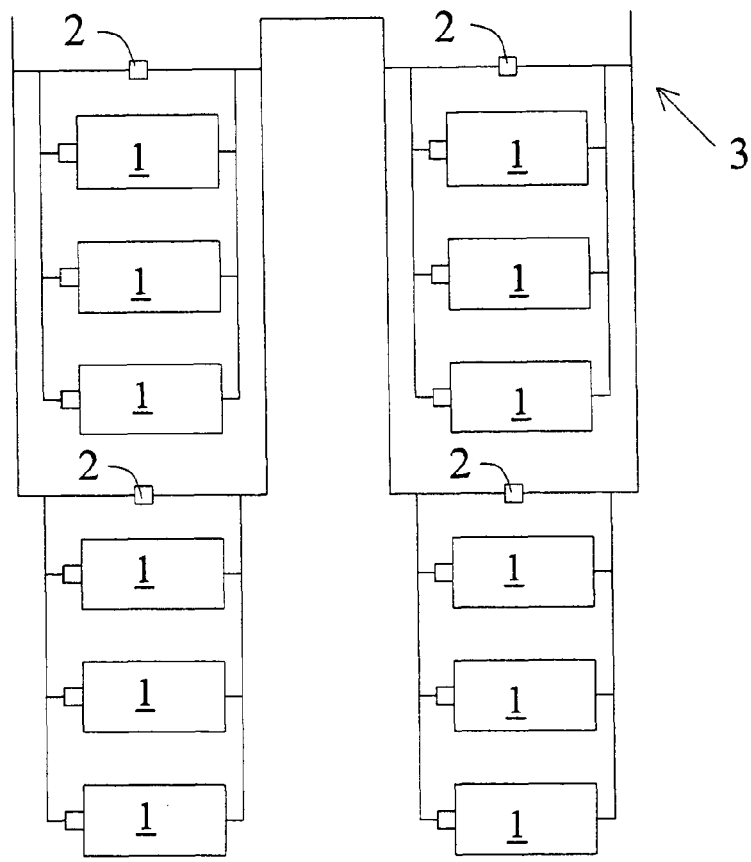
Figure 7C:
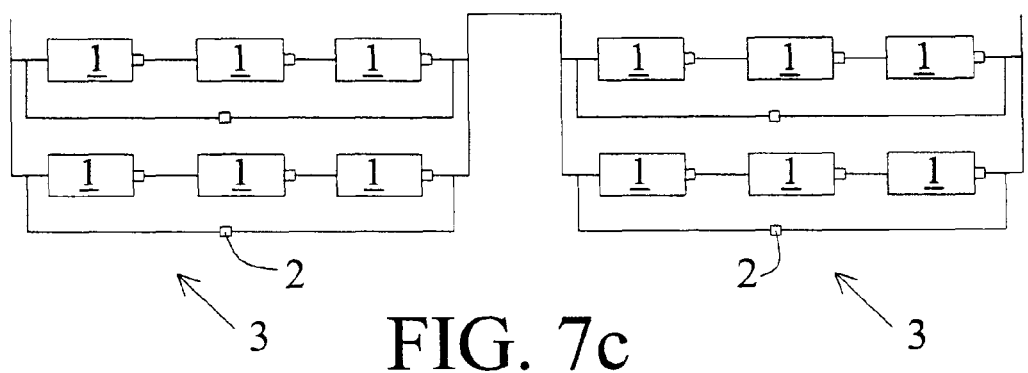
Figures 7D, 7E:
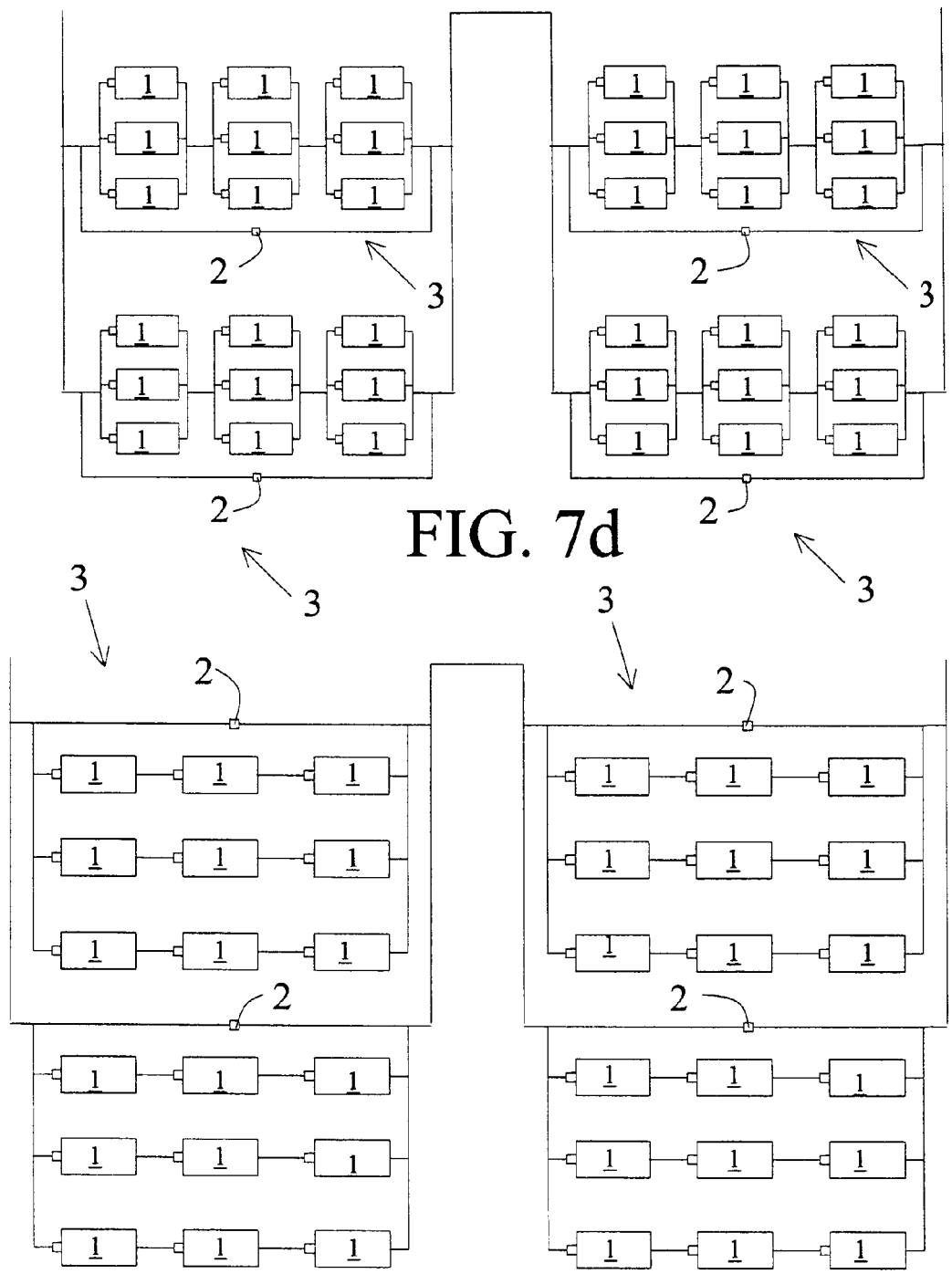
Figure 8A:
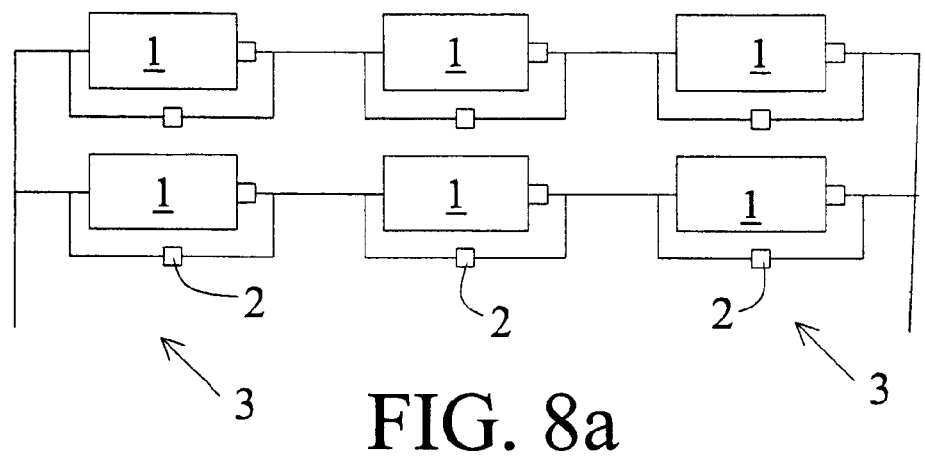
FIGS. 8a-e are schematic illustrations of battery packs having battery assemblies of the invention differing from those of FIGS. 5a-e, 6a-e and 7a-e.
Figure 8B:
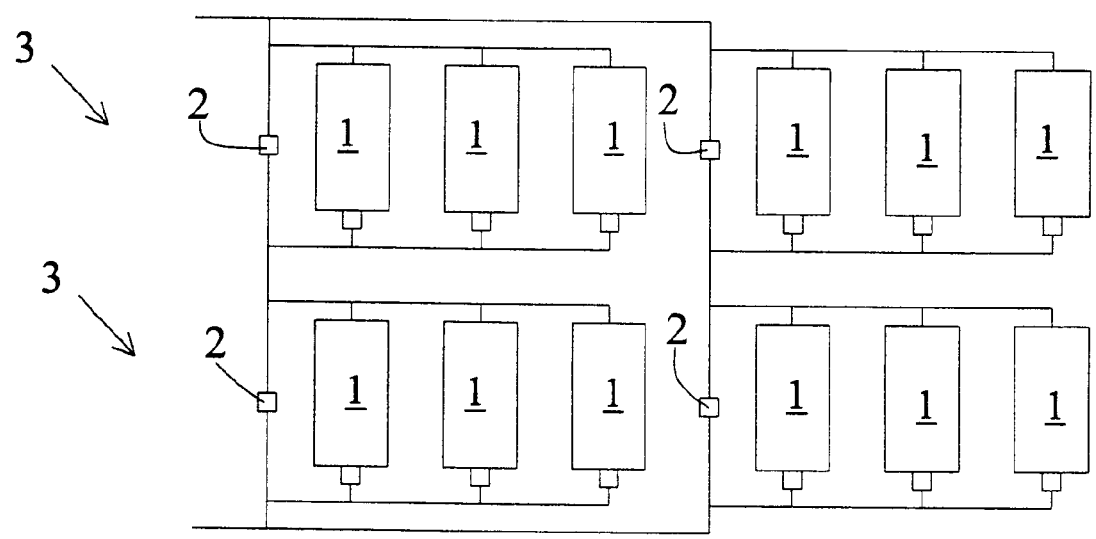
Figure 8C:
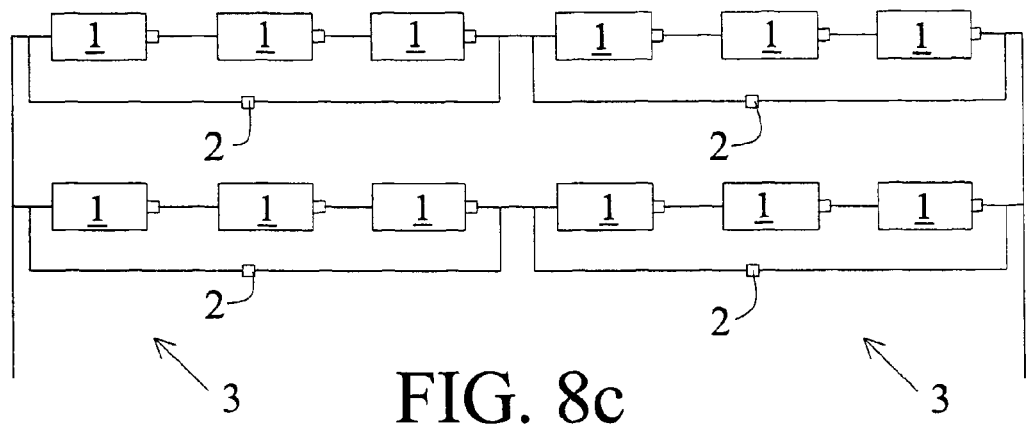
Figure 8D:
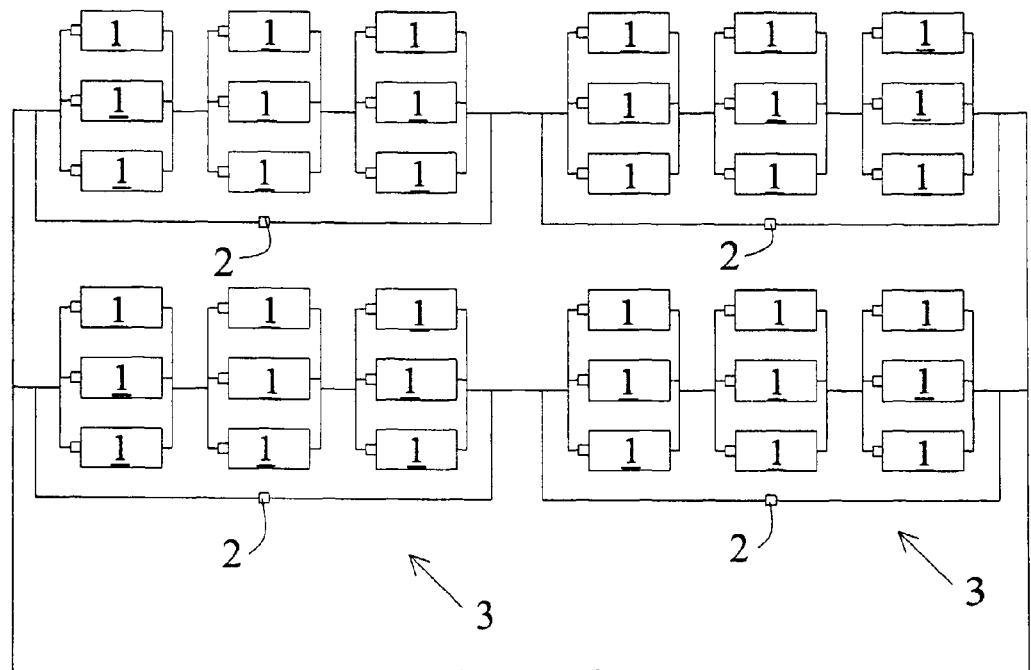
Figure 8E:
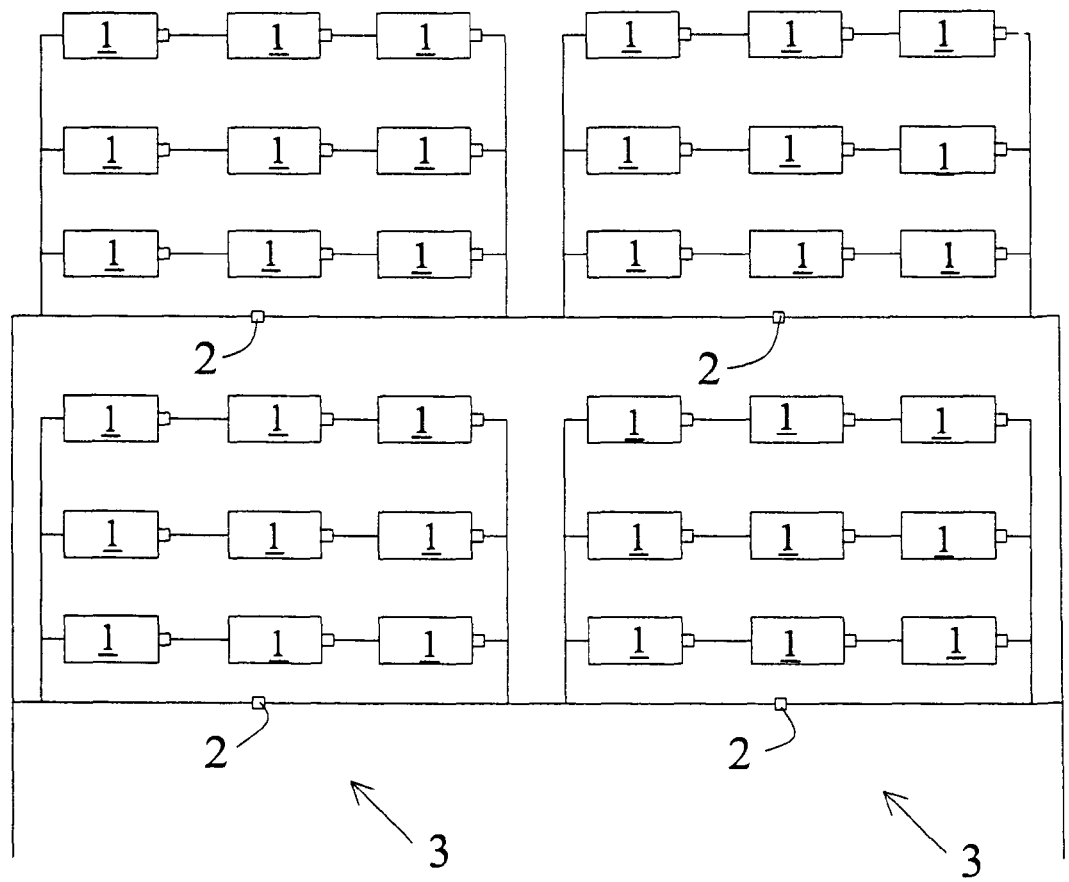

An electric power supply system is the integration of components including a charger 4, a battery system (packs or sets), a control board 10, and a circuit breaker 9, as shown in FIG. 4. Again, four battery assemblies of the invention are connected in series as a simplest example for demonstration. Referring to FIG. 4, it can be seen that each battery is connected in parallel with a circuit consisting of components as shown in FIG. 2(a) or FIG. 2(b). A control board is connected with electrical conductors to each terminal of each of the batteries. Those electrical conductors serve as a means for providing voltage detection. The other end of the control board is connected to a circuit breaker. The charger is connected directly to the two ends of the batteries electrically connected in series. During a normal charging (constant current/constant voltage), if any of the batteries exceeds a preset over-charge voltage, the control board sends a signal to the circuit breaker for charging termination. Similarly, during such discharging, if any of the batteries is below the preset termination voltage, the control board sends a signal to the circuit breaker for discharging termination. These two actions serve as battery protection to avoid over-charging and over discharging. During normal charging, a preset time period is allowed for the charging action (e.g. termination at 1.5 hours after constant voltage charging). At that time, the batteries may be more or less balanced. However, the batteries could be balanced after several chargings, or by just starting a balance charging (small current constant and current charge, current amplitude I<I') mode, to allow constant current charging until all the batteries are balanced.

In the present case, the control board can be a very simple device for detecting the voltages of each battery connected in series and sending signals to the circuit breaker for charging or discharging action termination. The simplicity of the control board is thus benefited by the characteristics of the batteries of the invention since they possess current leakage during charging. In the present invention, the shutting off of the charging is preferably executed by a electromagnetic relay that turns off the power input or output. This electromagnetic relay preferably requires no power consumption during the idle state, and a pulse signal generated by the control board determines the close and open circuit status of the relay and therefore the on and off of the battery charging.

EXAMPLE 5

Methods to Achieve Cell Equalization as Described in Example 1

Figure 11:
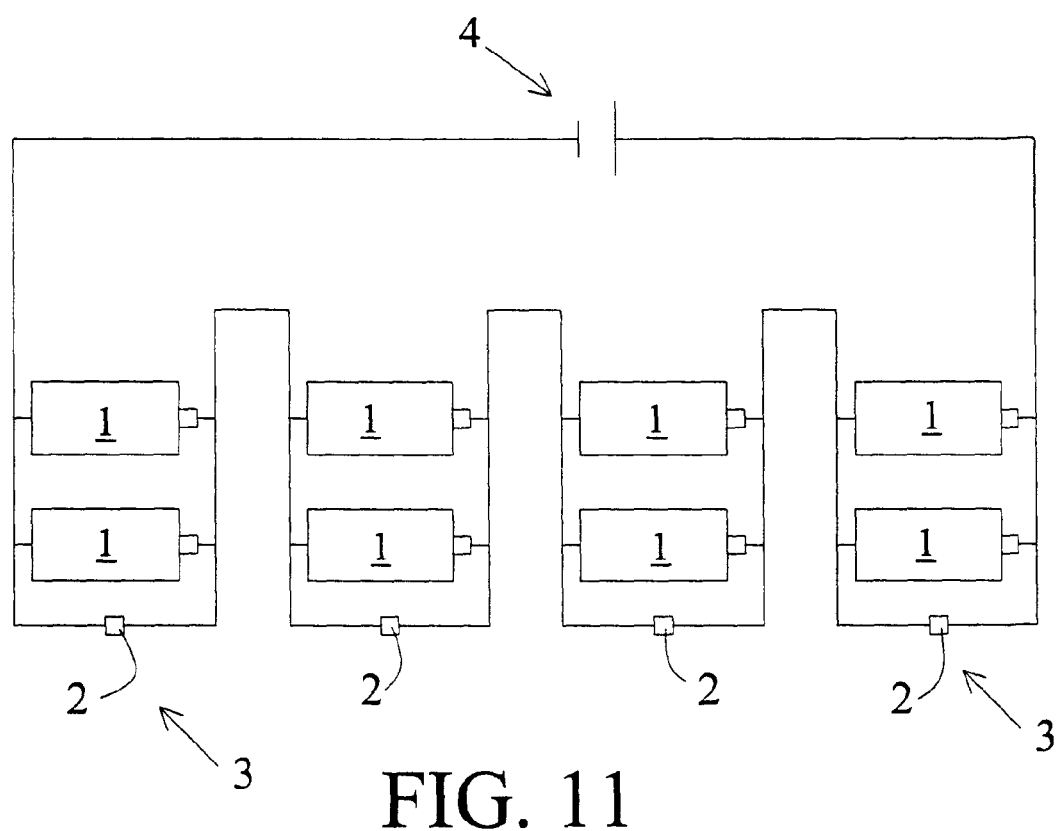
FIG. 11 is a schematic illustration of a battery system having battery assemblies of the invention, as discussed in example 5.

Referring to FIG. 11, in the present example, a total of eight 10 Ah lithium iron batteries are used for demonstrating the charging method and the cell balancing characteristic of the batteries during charging. Two cells are first connected in parallel to form a parallel battery set. Each set of the batteries are then connected with a circuit (a printed circuit board, for example) electrically connected in parallel with the battery set to form a battery assembly. Four battery assemblies are then connected in series. In the present case, the first set, second set, third set, and the fourth set are named for the four battery set assemblies connected in series for clarity. All four set assemblies are first charged to 100% full. The first battery set assembly is then subjected to discharge 10% capacity (2 Ah). After this procedure, all four battery set assemblies are connected in series and this setup is referred to as the battery pack. A preset self-discharge activation voltage is set at 3.75V in the present case. The self-discharge circuit that is parallel to each battery set has a resistance of 2 Ohm. After the above mentioned procedures, the battery pack is subjected to a constant current charge of 1.7 A. The voltage changes versus time for each set of the batteries are shown in Table I. From Table I it can be seen that the $2^{nd}$, $3^{rd}$, and $4^{th}$ battery set assembly had a voltage increase beyond 3.75V in the initial state. 5 minutes after, the $2^{nd}$, $3^{rd}$, and $4^{th}$ battery set assembly came back to be stabilized at 3.75V. At this time, the current passing through the resistor is measured to be 1.8 A.

The $1^{st}$ set of the battery set assembly increases its voltage gradually to 3.75V after 80 minutes and this is the end of the charge balance action. In the present experiment, I (power supply current) is set to be less than I' (current passing resistor). As a result, the voltages for the $2^{nd}$, $3^{rd}$, and $4^{th}$ sets of battery set assemblies were stabilized at 3.75V during charging. Full balances of the four sets of battery set assemblies were achieved after a certain period of time. It was observed that if current I is set to be slightly larger than current I' (1.8 A in this case), and the voltages of the $2^{nd}$, $3^{rd}$, and $4^{th}$ battery sets could be higher than 3.75V during the constant current charge. However, if the constant voltage charge is set at 15V as the second step charging, a voltage decrease of $2^{nd}$, $3^{rd}$, and $4^{th}$ battery sets can be observed (when current I starts decreasing below current I') and the four sets of battery set assemblies can be balanced eventually, but requiring a longer time.

In addition to the self-discharge setup and mechanism described above, there is another feature that can be integrated to the self-discharge setup as shown in FIGS. 2(a) and 2(b) by adding a timer (time counter) or a charge counter that controls the amount of charges being self-discharged under certain conditions. The core idea of adding a timer or a charge counter is to resolve the problem of batteries, battery sets, or battery packs being connected in series that can not be charged with prolonged constant voltage charge, that is, when charger or any means of charging (e.g. solar or wind turbine charging) do not provide long and steady constant voltage charge. In order to make batteries connected in series be balanced, without the presence of prolonged constant voltage charge, the self-discharge setup is provided with a timer. The function of the timer is to set a certain amount of charge in a battery to be self-discharged when certain conditions exist. While batteries are over-charged to a preset voltage V', the self-discharge mechanism is triggered. The self-discharge action continues until the battery voltage goes below the preset voltage V' and then the timer is triggered for further self-discharge for a certain period of time (e.g. 2% of the battery capacity, that is the time required to discharge the battery 2% of it's capacity). Although 2% is given as a preferred amount, a discharge amount of between about 2% and 20% of the battery's capacity is possible in practice of the invention. The advantages of this method include the following: (1) This time delayed self-discharge setup offers the functions described earlier in regard to Example 5, above, that is, when any of the battery set assemblies being connected in series is subjected to self-discharge when the voltage exceeds the preset voltage V', all the battery set assemblies being connected in series will be balanced eventually after prolonged constant voltage charge; (2) Unstable charging conditions, such as renewable energy power source charging (e.g. Solar panels, or wind turbines . . . etc.), or any other type of chargers that do not offer prolonged constant voltage charging will still be useful for charging the batteries while maintaining the performance (function) of battery cell balance. This can be realized using the same battery set assemblies described in Example 5 above, as an example, that is charged to a certain voltage and a cut-off is performed without constant voltage charging. The battery set assemblies being connected in series that have already exceeded the preset voltage limit V' will be kept discharging and a further self-discharge will be performed even when battery voltage drops down below the preset voltage V'. Owing to an additional self-discharge performed to those battery set assemblies already exceeding the preset voltage V', the capacity difference between those exceeded V' before cut-off (with self-discharge triggered) and those below V' before cut-off (without self-discharge being triggered) will be closer in capacity if the time utilized for constant voltage charge is insufficient; and (3) The constant voltage charging can be replaced by several voltage cut-off charging methods, as will be discussed in more detail in Example 6 below.

EXAMPLE 6

Method to Achieve Battery Cell Equalization without Prolonged Constant Voltage Charging The purpose of the present example is to demonstrate the need for the time delayed function of the invention for the self-discharge setup that achieves a battery cell balance condition without having a prolonged time for constant voltage charge.

Figure 12:
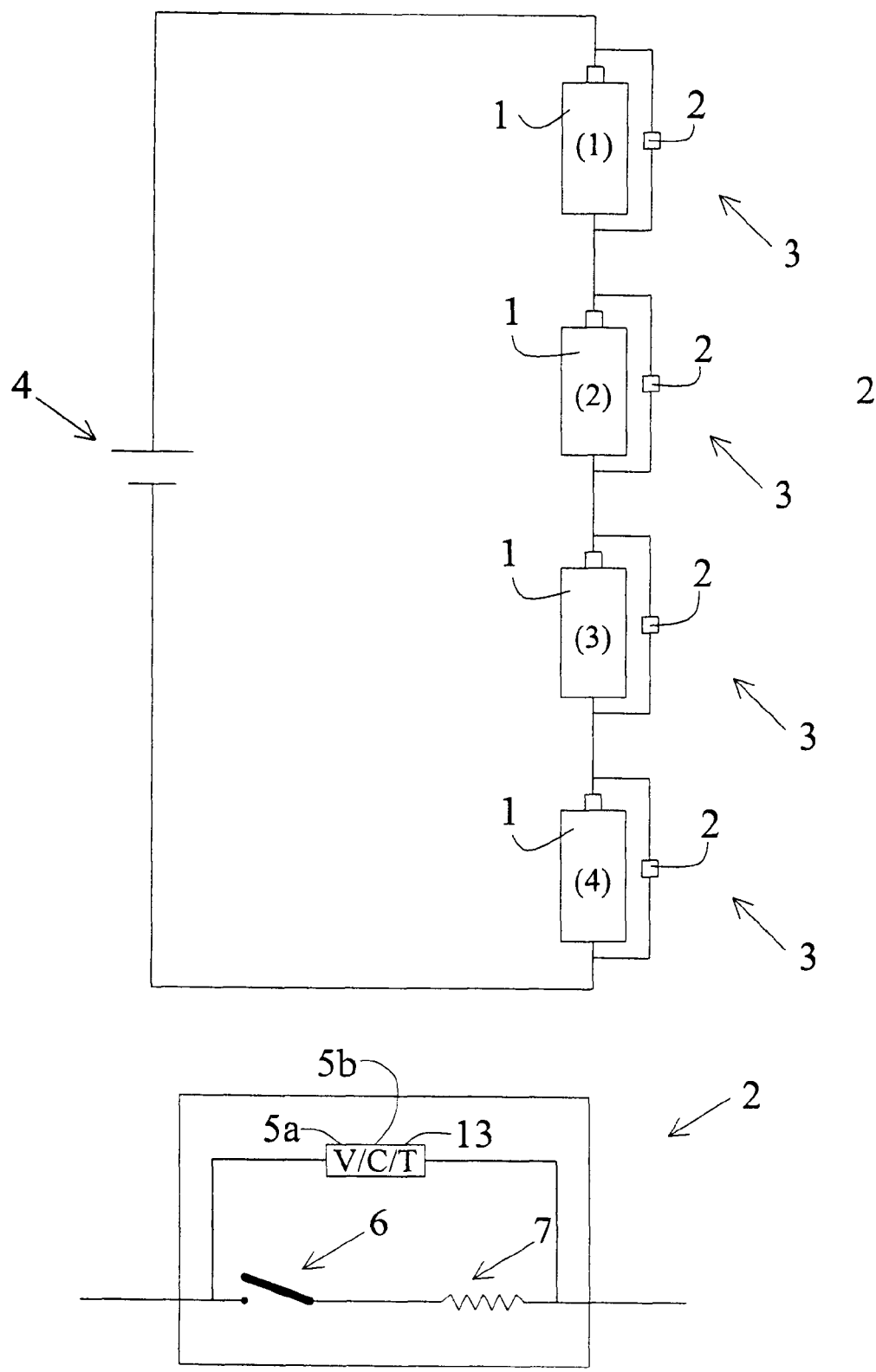
FIG. 12 is a schematic illustration of a battery system having battery assemblies of the invention, as discussed in example 6.
Figure 13A:
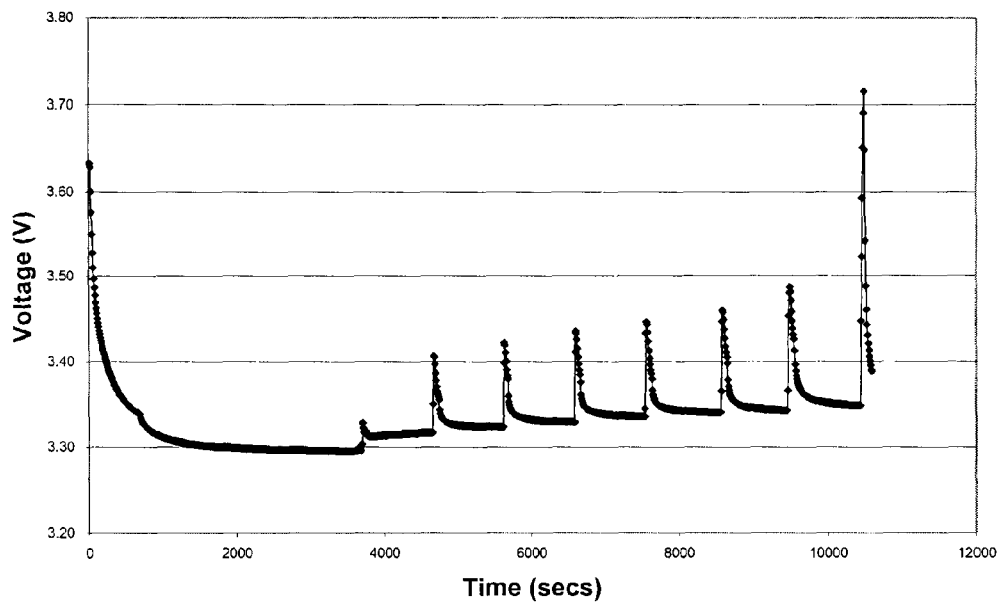
FIG. 13 (a)-(e) show experimental results for Example 6.
Figure 13B:
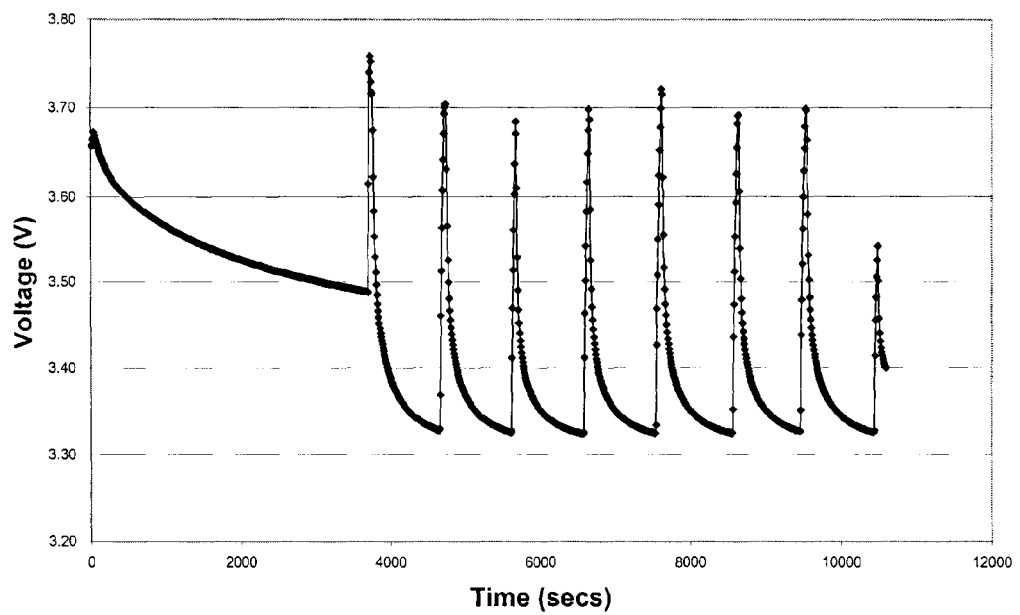
Figure 13C:
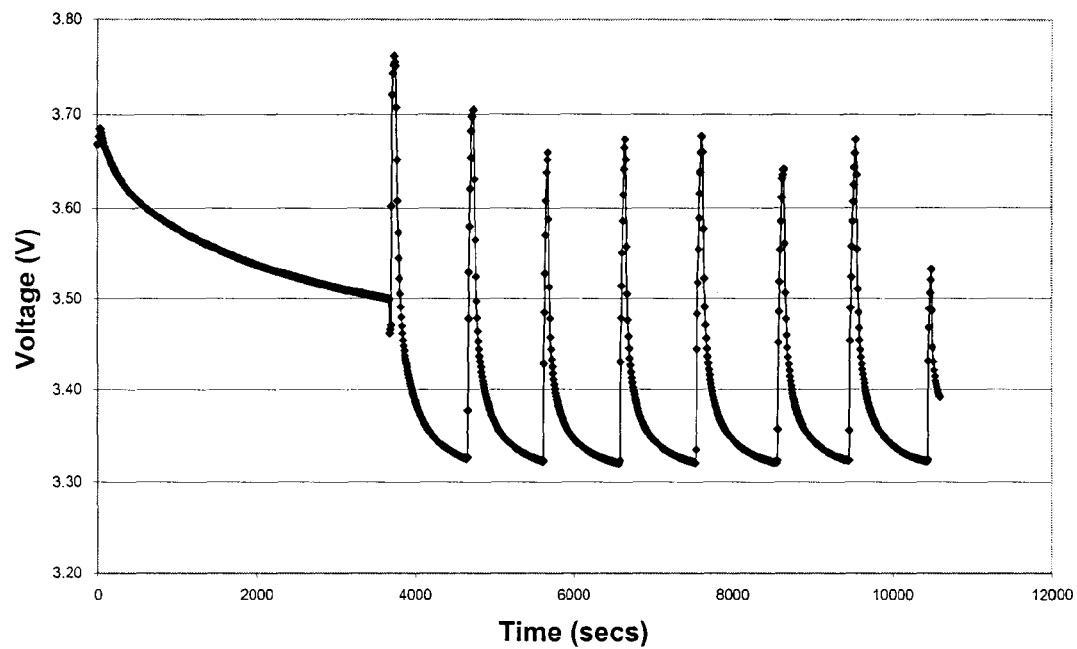
Figure 13D:
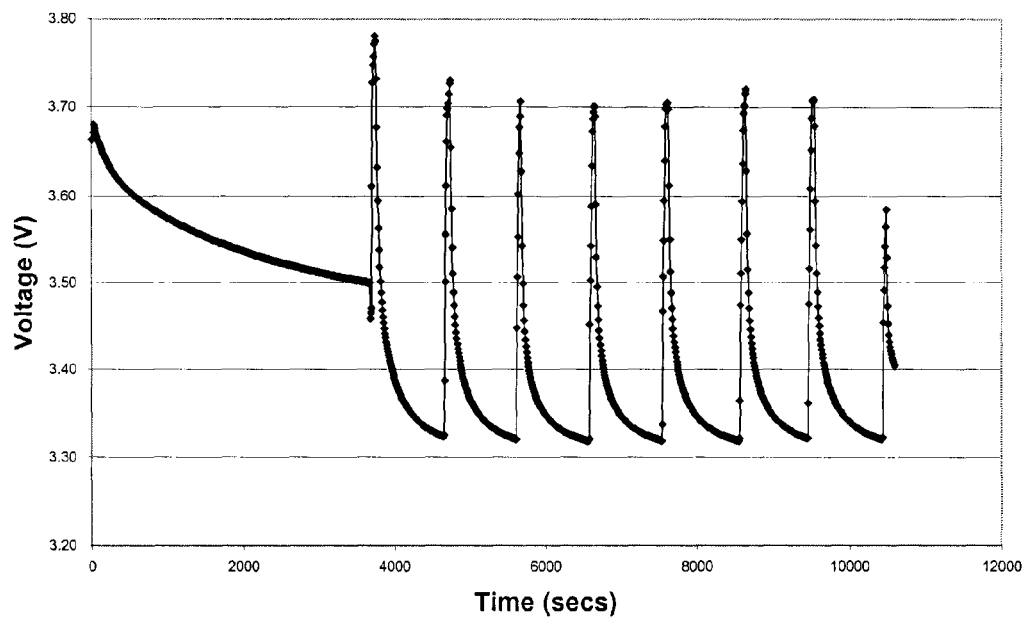
Figure 13E:
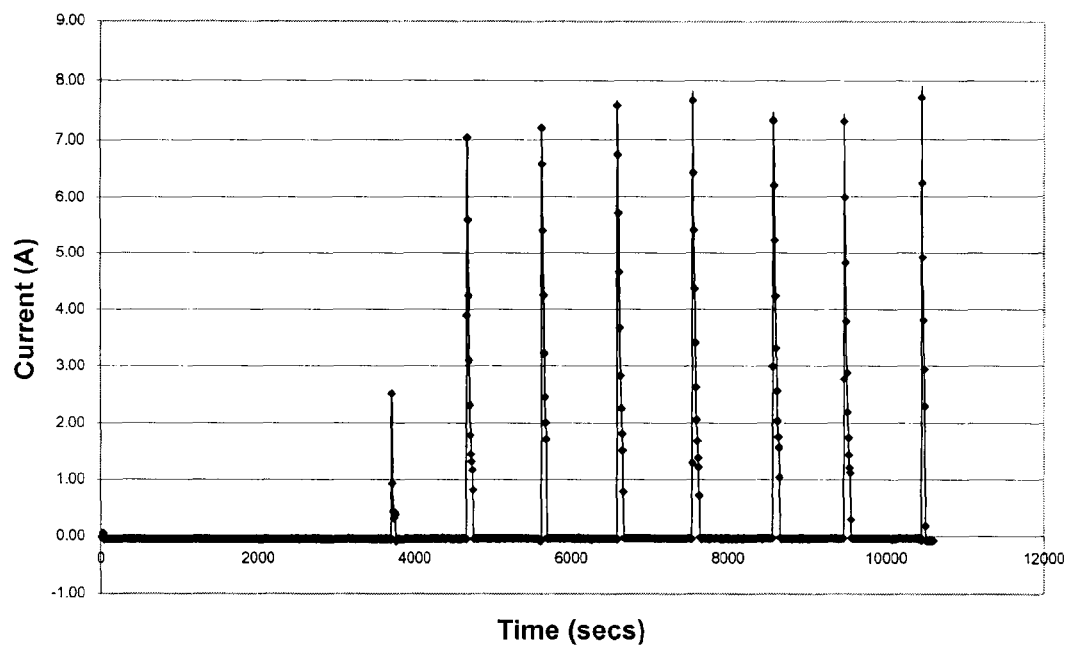

Referring to FIG. 12, in the present example a total of four 10 Ah lithium iron batteries are used for demonstrating the charging method and the cell balancing characteristic of the batteries during charging. Each battery 1 is connected with a circuit 2 electrically connected in parallel with the battery to form a battery assembly 3. Each circuit 2 contains a voltage detector 5a, a 10 Ohm resistor 7, and a timer 13, that allows self-discharge of the battery when the battery voltage exceeds or is equal to 3.65V, followed by a further self-discharge for a time period of 15 minutes when the battery voltage goes below 3.65V. Four battery assemblies are connected in series. In the present example the 4 battery assemblies in FIG. 12 have batteries numbered (1), (2), (3), and (4). The voltage changes versus time for each battery assembly are shown from FIGS. 13(a) to 13(e). The current versus time for the battery pack, which contains the four battery assemblies in series, is shown in FIG. 13(e). All four battery assemblies are first charged to 100% of capacity and balanced initially (3.65V±0.03V as can be seen from FIGS. 13(a) to 13(d)). The first battery assembly (battery (1)) is then subjected to discharge 6.6% capacity (0.66 Ah) using a 5 Ohm resistor for one hour. After this procedure, the battery pack that contains the four battery assemblies connected in series is subjected to a constant voltage charge set at 14.7V. However, the charger is set to cut-off when any of the battery assembly is charged above 3.70V. It can be seen from FIG. 13(a) to 13(d) that the $2^{nd}$, $3^{rd}$, and the $4^{th}$ battery assemblies (batteries (2), (3), and (4)) increases rapidly in voltage as soon as the charger starts charging. The charger stops charging almost immediately after it is activated. However, since the $2^{nd}$, $3^{rd}$, and the $4^{th}$ battery assemblies triggered the self-discharge voltage preset at 3.65V, a continuous drop in voltage is observed for each of them, even after the cut-off of the charger. In comparison to the $2^{nd}$, $3^{rd}$, and the $4^{th}$ battery assembly, the $1^{st}$ battery assembly does not have any self-discharge after the cut-off of the charger thus a flatter voltage profile is observed. After 8 cycles of charging it is observed that the 1st battery assembly becomes the only one that performs self-discharge (increase over 3.65V in voltage) and cut-off the charging process when it exceeds 3.70V. This result suggests cell balance can be achieved with multiple charging by setting voltage as a cut-off. A recovery of 6.6% battery capacity difference can be compensated for with multiple charging steps with the utilization of time delayed self-discharge setup for each of the batteries. With a further charging of the four batteries in series at 14.7V with the removal of self-discharge setup on each battery, an overall capacity input of 3.7% to 0 current is obtained. This implies all the batteries are close to being fully charged after 8 consecutive chargings, even without the presence of prolonged constant voltage charging. According to the experimental results shown, there is no rigid limitation of what components are used for the time-delayed self-discharge mechanism. Any integrated circuits, transistors, or even setups integrating components including voltage sensor, resistor, and timer or charge counter manually can achieve the goal of balancing the batteries connected in series without prolonged constant voltage charging.

Although Example 6 is for four battery assemblies connected in series as shown in FIG. 12, the method of the invention applies to batteries arranged as shown in FIGS. 5(a)-11, and expanded versions of those arrangements.

TABLE I

Voltage versus time for each set of the batteries.
40138 12 V 20 Ah Lithium Iron Cell Balance Charging Test
Constant current charge (current = 1.7 A)

| Time (minutes) | Set Number | | | |
|---|---|---|---|---|
| | 1 | 2 | 3 | 4 |
| | Initial Voltage (V) | | | |
| | 3.344 | 3.354 | 3.348 | 3.35 |
| | Voltage for each set (V) | | | |
| 0 | 3.401 | 3.883 | 3.852 | 3.861 |
| 5 | 3.457 | 3.761 | 3.757 | 3.759 |
| 10 | 3.462 | 3.752 | 3.761 | 3.762 |
| 15 | 3.473 | 3.753 | 3.755 | 3.757 |
| 20 | 3.481 | 3.756 | 3.751 | 3.754 |
| 30 | 3.499 | 3.759 | 3.752 | 3.757 |
| 40 | 3.558 | 3.753 | 3.756 | 3.755 |
| 50 | 3.633 | 3.758 | 3.754 | 3.756 |
| 60 | 3.757 | 3.751 | 3.753 | 3.754 |
| 70 | 3.752 | 3.757 | 3.756 | 3.752 |
| 80 | 3.759 | 3.751 | 3.754 | 3.755 |

As mentioned before, for a single battery unit, it can be called "a battery" or "a cell". The terminology "battery set" or "cell set" used throughout the specification means a plurality of batteries connected in parallel, or series, or parallel-series, or series-parallel. The terminology "battery pack" or "cell pack" used throughout the specification means a plurality of battery sets connected in parallel, or series, or parallel-series, or series-parallel. The terminology "assembly" used throughout the specification means a battery (or a cell), a battery set (or a cell set), or a battery pack (or a cell pack) accompanied with a means for self-discharge of the battery(s) (or cell(s)), battery set(s) (or cell set(s)) or battery pack(s) (or cell pack(s)) when the battery(s) (or cells(s)) is (are) being over-charged. A battery system can be constructed using either one or more cell packs. The battery system is usually referred to the finished form that is ready for charge/discharge cycles.

Three essential controls are presented in the first three parts below. The last part (Part IV) is used for introducing the construction of an advanced battery system with some examples being illustrated.

Part I. The Balancer

Figure 14:
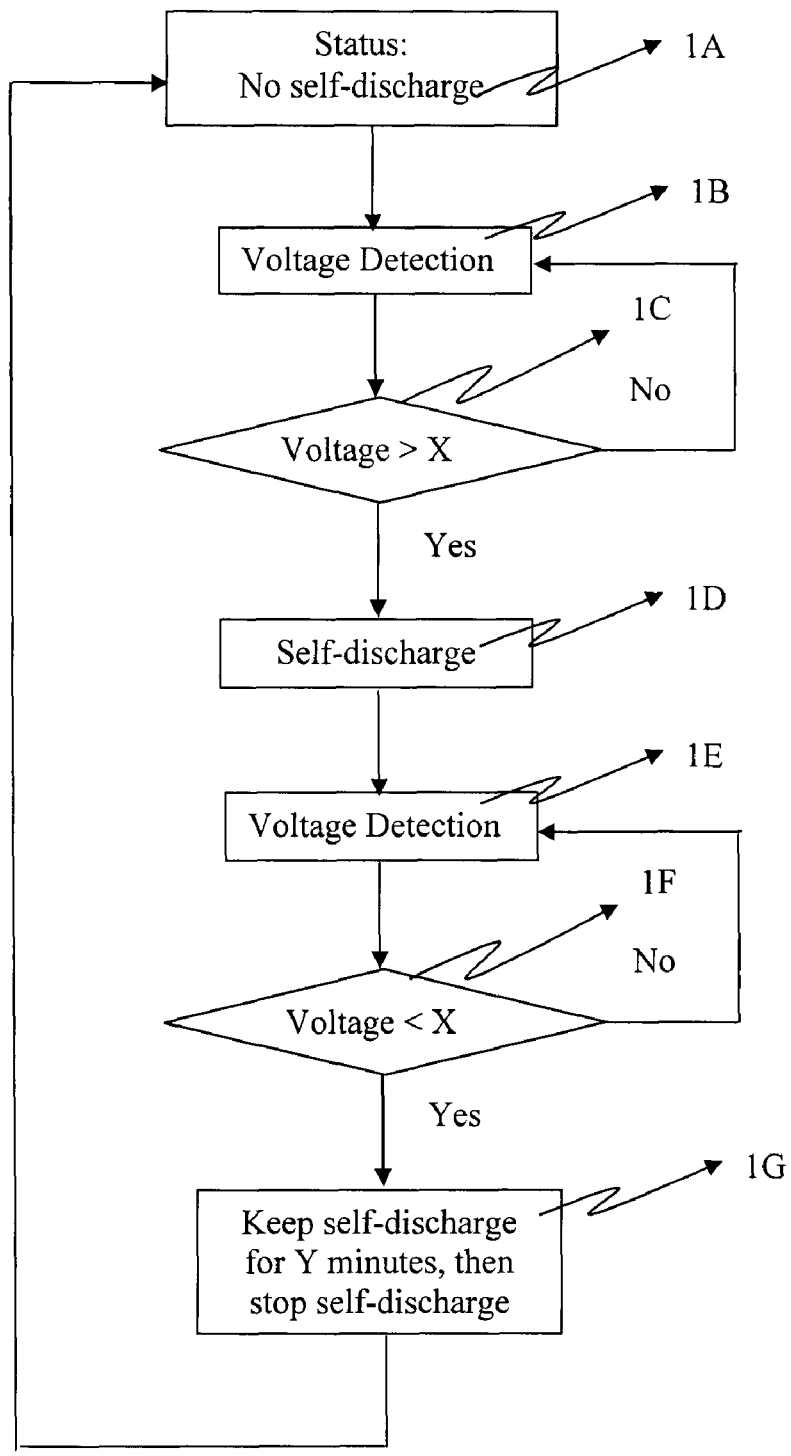
FIG. 14 is a flow chart of a device of the present invention for controlling the cells, cell sets, or packs self-discharge.

The most important concept of the balancer is the use of a voltage and time dual control for discharging the cells. FIG. 14 shows the flow chart of a typical balancer that discharges the cells. One (or several) IC (integrated circuit) is (are) designed for monitoring the voltages of each cell and the time for discharging each cell. A typical example is an IC on a printed circuit board that controls eight channels simultaneously. Each channel voltage is monitored independently and the time for discharging the cell is also counted independently. Taking one channel as an example: When a cell voltage exceeds a threshold voltage, a discharge of the cell is initiated. The discharge activity is terminated only when cell voltage drops below the threshold voltage for a certain period of time. The time duration can be set as short as several minutes to as long as several hours depending on the application. A typical case is a cell with capacity rated at 10 Ah will start discharging the cell when the voltage exceeds 3.5V. An external 10 Ohm resistor is utilized for discharging the cell and the discharging activity is terminated when voltage drops below 3.5V for 1 hour.

Part II. The Over-Charge/Over-Discharge Protection

Figure 15:
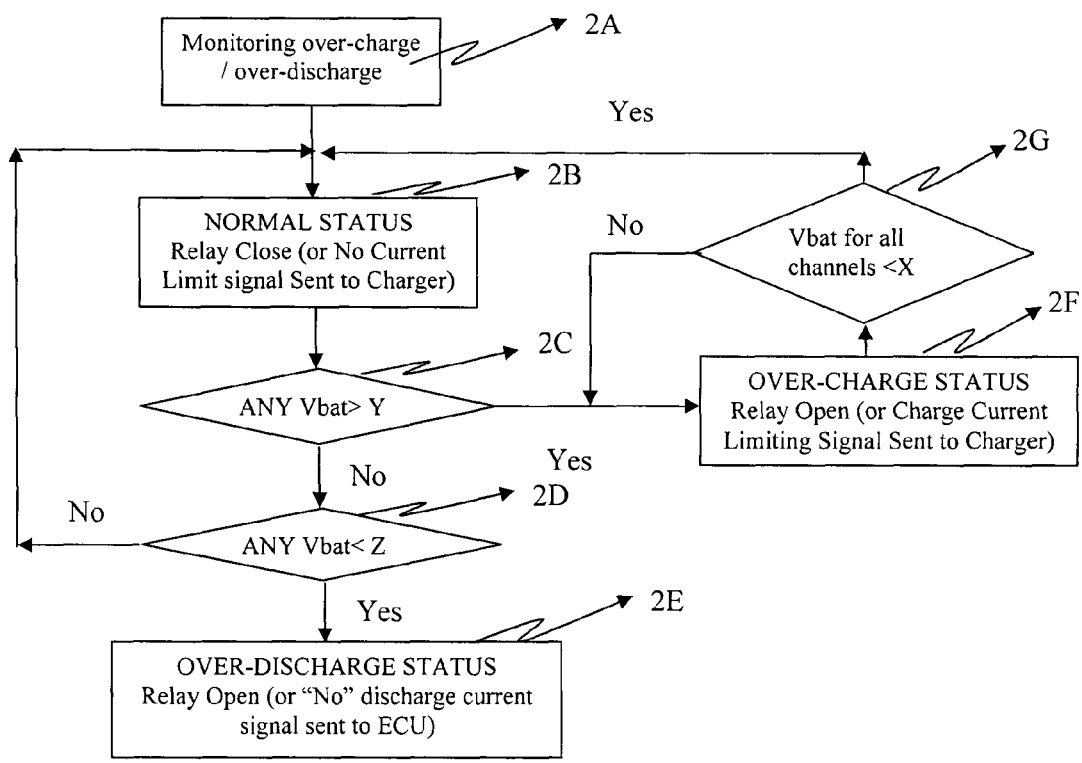
FIG. 15 is a flow chart of an over-charge/over-discharge controlling board of the invention with a resume function.

A typical over-charge/over-discharge protection flow chart for each cell is shown in FIG. 15. Similar to the balancer introduced in Part I, an IC is designated in monitoring the over-charge/over-discharge conditions for each cell. A typical example is an IC on a printed circuit board that controls eight channels simultaneously. When an over-charge condition is met for a cell (typically 4.0V), a pulse is sent to a relay (usually an electromagnetic latching relay) that terminates the current input from charger for the prevention of over-charging the cell. In the case for high voltage applications such as plug-in hybrid vehicle that operates at 300V or more, instead of using a relay for immediate termination of charging activity, the over-charge signal is sent to the vehicle ECU (electronic control unit) for terminating the charging activity for the prevention of damaging other electrical devices on board such as a motor or a genset.

One most important feature of the over-charge control that is essential in the present invention is the "automatic resume" function of the relay. A typical example is an IC that controls eight channels simultaneously: When an over-charge condition is met for one of the cells, a pulse is sent to a relay (usually an electromagnetic latching relay) that terminates the current input from charger for the prevention of over-charging the cell. The charging is resumed when "all" cell voltages drop to a preset voltage. This means a charging activity is resumed when "all" cell voltages below to a preset voltage (Please refer to FIG. 15). This typical voltage could be 3.4V for the case of lithium iron phosphorous oxide or other LiFePO$_4$ type of cells.

Part III. The Charger

One more important feature essential to the present invention is the control of the charger. Conventionally, lithium ion cells are suitable for a charging condition that starts at a constant current charging stage followed by a constant voltage charge stage at a preset voltage for a prolonged period of time. In the present invention, the charger terminates the charging activity when voltage hits a preset voltage (typically a higher voltage). And a resume of charging activity is conducted when voltage drops below another preset voltage (typically a lower voltage). Also, there can be a preset time period). The "termination" and "resume" feature of the charger in between two preset voltages implies no constant current charging is necessary in this invention.

While terminating and resuming the activity of charging, instead of disconnecting the relay at the DC end (current output end) that may generate an electric arc when disconnecting, the termination of charging from the charger can be performed at the AC end (current input end) of the charger. Such procedure helps in the prevention of electric an arc being developed at the relay thus enhancing the safety and service life of the relay. For example, in the case of high voltage applications such as plug-in hybrid vehicle that operates at 300V or more, the termination of the charging should be performed at the AC end of the charger for safety reasons. Nonetheless, minimization of charging current via means of controls that enables a "resume voltage" condition being reached would lead to the same result as direct cutoff using a relay.

Part IV. The Battery System

According to the definition of a battery system as mentioned in the background section, a battery system is a combination of one or more cell packs (battery packs), ready for connecting to a charger. The following example demonstrates how a battery system performs well with proper control of: 1. Discharge mechanism for balancing, 2. Over-charge protection with a resume feature, and 3. Charger terminals with a high voltage cutoff and resume (either a lower voltage or a preset period of time) feature.

EXAMPLE 7

A 52V Battery System Comprising 2 Cell Packs in Series

In the present example, a 52V battery system is used for demonstration. This 52V battery system consists of two cell packs in series that exhibit 26V for each of them. Each cell pack contains 8 sets of cells in series with 8 cells in parallel in each cell set. Each cell has a capacity of 10 Ah.

In this battery system, each cell set is discharged with a 5 Ohm resistor when the cell set voltage exceeds 3.5V. When the cell set voltage drops down below 3.5V, a one hour duration will be counted and a termination of discharging is conducted at the end of the discharge.

An over-charge condition is set at 4.15V for each cell set. A resume charging voltage is set at 3.65V when "all" cell sets monitored are below 3.65V. In this case, an eight channel over-charge/over-discharge printed circuit board is used for monitoring the eight cell set voltages and performing "charging termination" and "charging resume" at 4.15V (when any of the set hits this voltage) and 3.65V (when all eight cell sets are below this voltage) respectively. The relay being triggered by the over-charge/over-discharge board is deployed in each of the cell packs.

The charger used in this example is a conventional lead acid battery charger that performs a constant power output. In the present case the cutoff voltage is set at 56.5V and the resume voltage is set at 53.8V. When the cutoff voltage is reached, the relay deployed at the AC end opens (56.5V). Similarly, when resume voltage (53.8V) is met, the relay closes again.

Figure 16A:
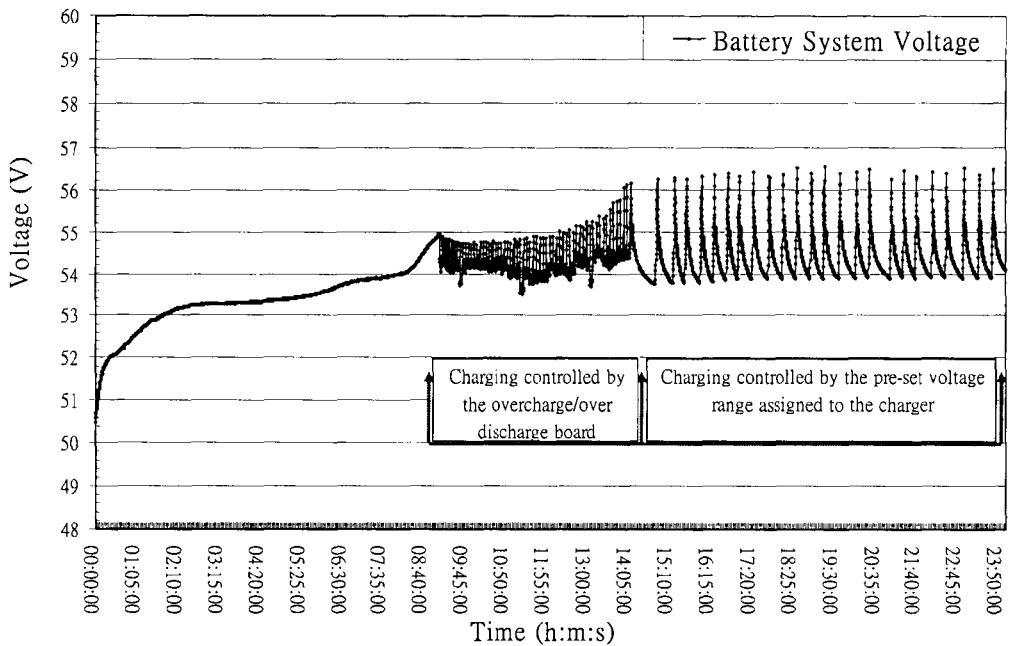
FIG. 16(a)-(d) show experimental results for Example 7.
Figure 16B:
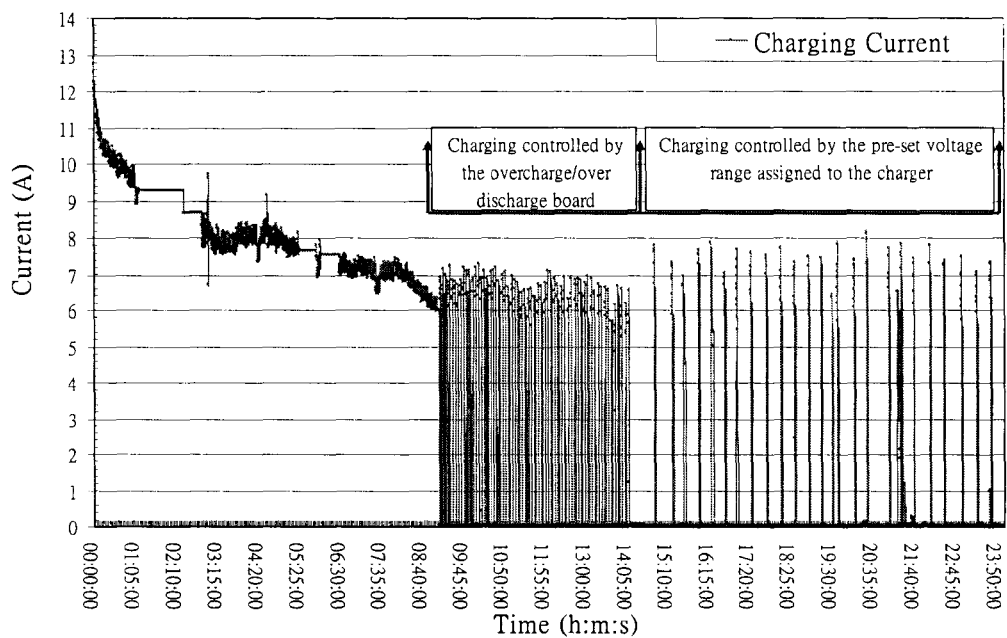
Figure 16C:
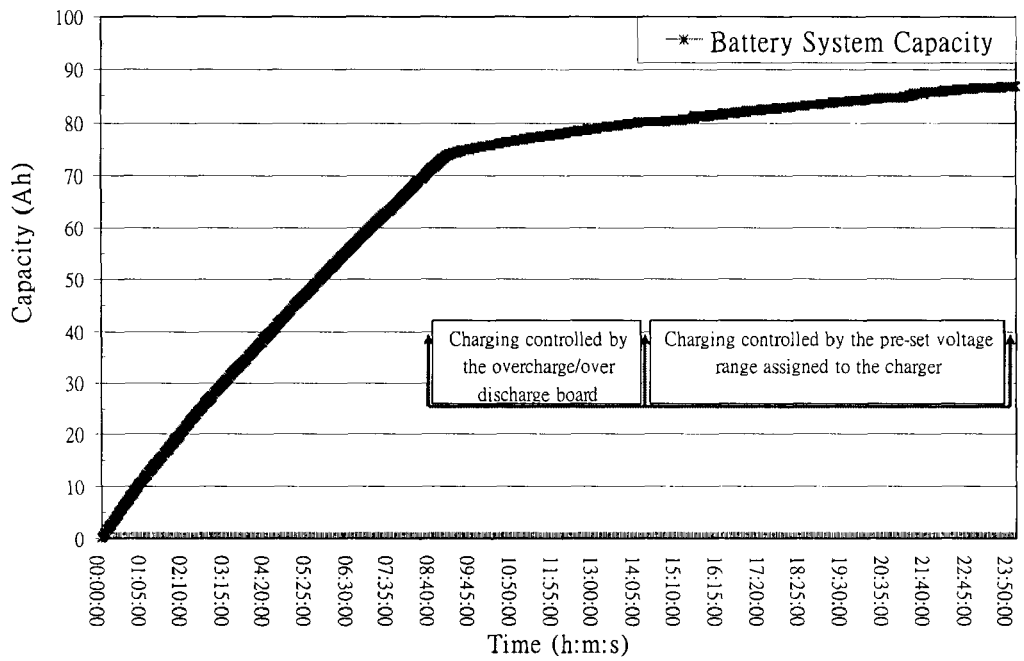
Figure 16D:
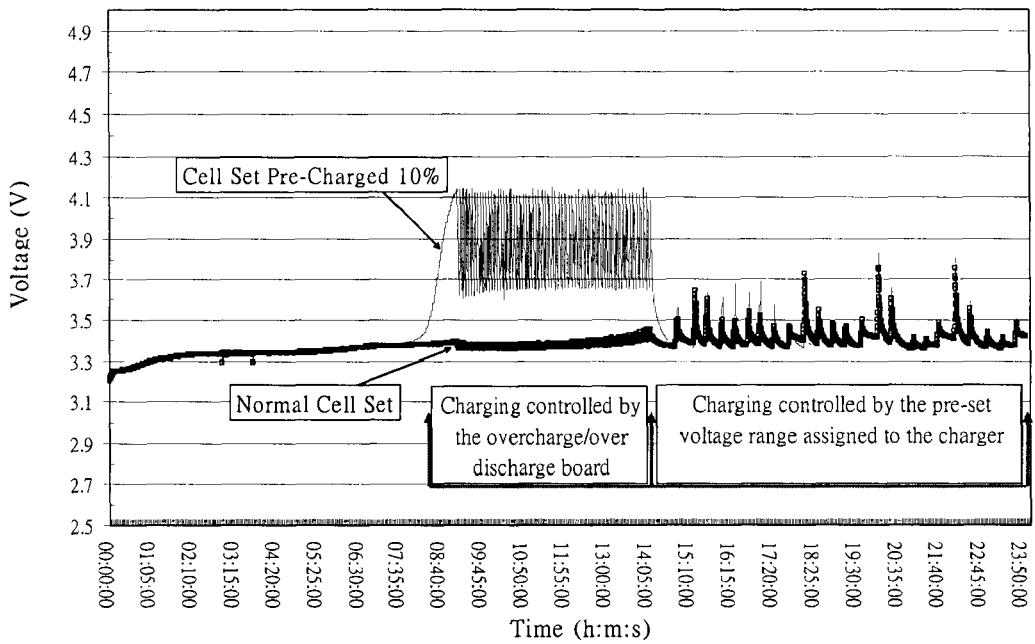

The cell packs were first discharged to 0% in capacity. One of the cell sets was pre-charged to 10% of its nominal capacity (8 Ah) before charging the two cell packs in series. FIG. 16(a) shows the recorded battery system voltage, 16(b) the charging current, and 16(c) the battery system capacity. FIG. 16(d) shows the voltage of the 10% pre-charged cell set and one of the normal cell set without pre-charging for comparison. All figures are shown at the same time scale so the figures can be stacked for comparisons. From FIG. 16(a) to (d), several aspects can be concluded as follows:

1. 4.15V cutoff condition set by the over-charge/over-discharge board is reached before the 56.5V cutoff voltage set by the charger. During this time period, the relay status "close" or "open" is first determined by the over-charge/over-discharge board as shown in each figure indicated as "Charging controlled by the over-charge/over-discharge board". The relay being triggered is the one being deployed in the battery module.

2. During the time period "Charging controlled by the over-charge/over-discharge board", the overall battery assembly voltage gradually increases to the charger's cutoff voltage. When 56.5V is reached, the relay on the charger starts dictating the charging process. This is represented in each figure (from FIGS. 16(a) to 16(d)) indicated as "Charging controlled by the pre-set voltage range assigned to the charger". The relay being triggered during this period is the one being deployed in the charger.

3. Without the balancers, there is no chance for cell capacity being balanced over the charging period.

4. Without the over-charge/over-discharge board, there will be chances for over-charging the cells during charging. This is obvious from 3(a) as 4.15V cutoff is reached when the battery system voltage is only 55V. If a 56.5V is forced to be reached by the charger, cell voltage going higher than 4.15 will definitely occur. It is worthy to note that the cell over-charging is more likely to occur when a large number of cells (or cell sets, or cell packs) are being connected in series. This is especially serious for applications in EV or plug-in hybrid vehicles (Please refer to Example 7).

5. A charger possessing repeated charging without the constraints of a constant voltage and a constant current charging is thus allowed for the lithium ion batteries without running the risk of "over charging" any of the cells.

Figure 17:
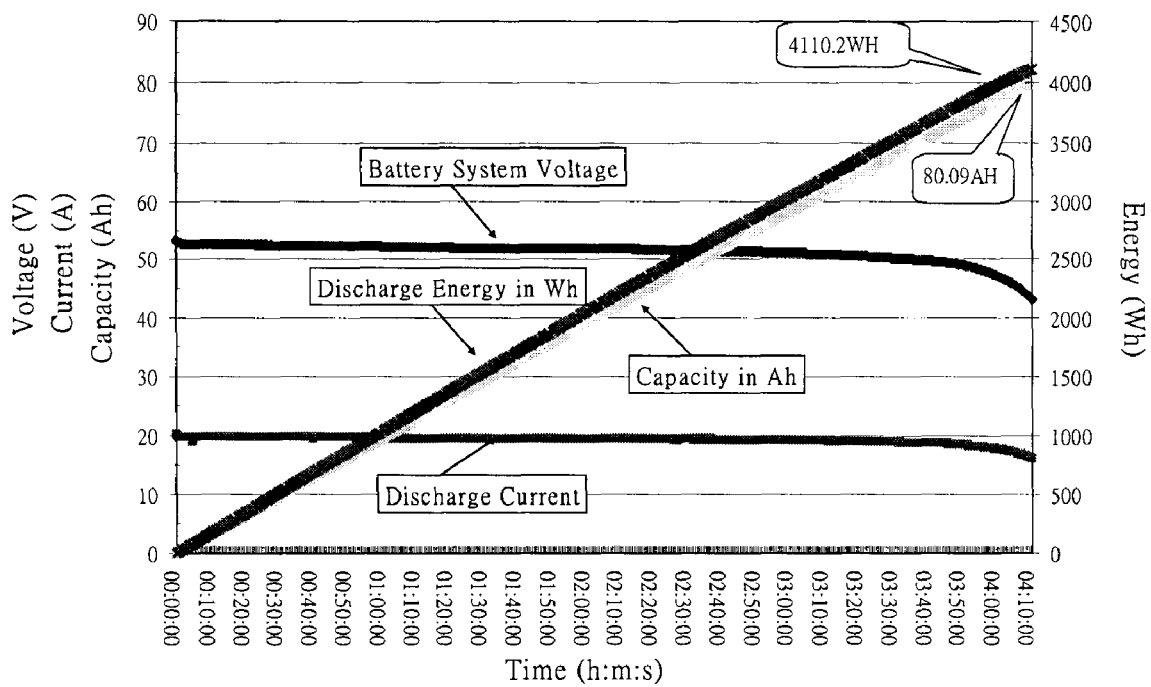
FIG. 17 is the discharge capacity of the battery system introduced in Example 7.

The battery system being charged as shown in FIG. 16(a) to FIG. 16(d) was discharged later on and the capacity versus time is shown in FIG. 17. This proves a full capacity of 80 Ah is recoverable after controlled repeated chargings.

More comprehensive descriptions of the present invention:

1. With the controls of a). Discharge mechanism for balancing, b). Over-charge protection with resume feature, and c). Charger terminals with a high voltage cutoff and resume feature, any renewable energy source with unstable voltage and current output (or input for the battery system) can be used for charging the battery system without running any risk of damaging the battery system (e.g.—charging the cells or cell sets) while maintaining the cells or cell sets' balance in the battery system. In other words, renewable energy power sources can be a charging power source for charging the battery system.

2. The charging activity termination can be conducted on the battery system side, on the charger side (or renewable energy output side), or both depending on the design of the system.

3. The charging activity termination (no charging) can be replaced by a small current input. The current magnitude can be equal or smaller than the current that discharges the cell or cell sets. However, the charger terminals with high voltage cutoff (followed by a limited current magnitude) and a resume (being triggered by either a lower voltage or a preset period of time) feature ensures that the battery system is fully charged after a repetition of charges. Some details can be found in the description of Example II.

EXAMPLE 8

A 312V Battery System Comprising 6 Cell Packs in Series

In the present example, a 312V battery system is constructed for demonstration. This 312V battery system consists of six cell packs in series that exhibit 52V for each of them. Each cell pack contains 16 sets of cell sets in series with 3 cells in parallel in each cell set. Each cell has a capacity of 18 Ah. A total of 15 kWh in energy is stored for plug-in hybrid applications.

In this battery system, each cell set is discharged with a 5 Ohm resistor when cell set voltage exceeds 3.5V. When the cell set voltage drops down below 3.5V, a one hour duration will be counted and a termination of discharging is conducted at the end of the discharge.

An over-charge condition is set at 4.15V for each cell set. A resume charging voltage is set at 3.65V when "all" cell sets monitored are below 3.65V. In this case, two of the eight channel over-charge/over-discharge printed circuit board is used for monitoring the 16 cell set voltages in each cell pack. When any of the over-charge/over-discharge board channel is under the "charging termination" and "charging resume" conditions triggered at 4.15V (when any of the set hits this voltage) and 3.65V (when all eight cell sets are below this voltage) respectively, the over-charge/over-discharge board sends a signal to the vehicle ECU. The ECU then sends a controller area network (CAN) messages to the charger for minimizing the charge current to a magnitude less than or equal to the current passing the balancer. A zero current is possible in this case, which is similar to a "termination" condition described in Example 7. It should be further mentioned that the "termination" can be achieved by disconnecting the AC end of power supply thus achieving the same result as minimizing the current magnitude method described above.

Any time when the ECU receives either an "over-charge" signals from any of the cell sets or detects that a battery system voltage exceeds 336V (assume 56 cells in one pack and 6 cell packs in series), charging current will be either terminated or minimized with a duration of one hour (same as the balancers work time). Resumed charging thus ensures the battery system being fully charged in several hours without risks of running into a "damage by an over-charging" situation. Of course, if a low resume voltage detected by the charger is reached (318V, assume 53V in one pack and 6 packs in series), the charging can be resumed before one hour limit (set as described above) as well.

Again, three major controls introduced in the present invention: a). Discharge mechanism for balancing, b). Over-charge protection with resume feature, and c). Charger terminals with high voltage cutoff and resume feature (resumed by voltage or time), ensure a battery system being fully charged and balanced in a short time even in large system applications such as a plug-in hybrid vehicle application.

The invention claimed is:

1. A rechargeable battery system having a plurality of cells and a charging means for charging the rechargeable battery system, comprising
    a plurality of cells electrically connected to form a rechargeable battery system;
    a self-discharge voltage measuring means for continually measuring a self-discharge voltage and a corresponding self-discharging means, both connected in parallel to at least one of a cell in a series circuit, a cell set in a series circuit and a cell pack in a series circuit;
    an over-charge voltage measuring means for continually measuring an over-charge voltage across at least one of a cell in a series circuit, a cell set in a series circuit and a cell pack in a series circuit;
    a charging means connected in series with the rechargeable battery system for charging all of the cells of the rechargeable battery system;
    a system voltage measuring means for continually measuring a system voltage across the charging means;
    a limiting means for limiting the charging current of the rechargeable battery system; and
    a controlling means for controlling the rechargeable battery system, wherein:
    (a) during charging, if the self-discharge voltage measured by any one of the self-discharge voltage measuring means is $\geq$ a preset self-discharge voltage, then, the corresponding self-discharging means operates until the measured self-discharge voltage is less than the preset self-discharge voltage, then, the corresponding self-discharging means does not operate; and
    (b) during charging, if any of the measured over-charge voltages is > a preset overcharge voltage, then, the charging current to the rechargeable battery system is limited, then, when all the measured over-charge voltages are $\leq$ a preset first resume voltage, then, the charging current to the rechargeable battery system is not limited; and
    (c) during charging, if the measured system voltage is > a preset overall voltage, then, the charging current to the rechargeable battery system is limited, then, when the measured system voltage is $\leq$ a preset second resume voltage, then, the charging current to the rechargeable battery system is not limited; and
    (d) during charging, if the period of time for the charging current to the rechargeable battery system being limited is > a preset system period of time, then, the charging current to the rechargeable battery system is not limited.

2. The rechargeable battery system of claim 1, wherein
in (a), when the self-discharging means operates until the measured self-discharge voltage is less than the preset self-discharge voltage, the self-discharge means further operates for a preset period of time.

3. The rechargeable battery system of claim 2, wherein
the preset period of time is a period of time that provides a discharge of a preset percentage of a charge capacity of each of the at least one of a cell in a series circuit, a cell set in a series circuit and a cell pack in a series circuit.

4. The rechargeable battery system of claim 3, wherein
the preset percentage of the charge capacity is in the range of 0.1 to 20 percent.

5. The rechargeable battery system of claim 1 or 2, wherein
the charging means is a renewable energy power source device.

6. The rechargeable battery system of claim 1 or 2, wherein
The charging means is at least one of a photovoltaic cell charger, a wind powered charger, and an internal combustion engine powered charger.

7. The rechargeable battery system of claim 1 or 2, wherein
in (b) and (c), when the charging current to the rechargeable battery system is limited, the charging current is limited to zero.

8. The rechargeable battery system of claim 7, wherein
the limiting means is at least one of a circuit breaker in the series circuit of the charging means and the rechargeable battery system, a circuit breaker at the DC output of the charging means and a circuit breaker at the AC input of the charging means.

9. The rechargeable battery system of claim 1 or 2, wherein
in (b) and (c), when the charging current to the rechargeable battery system is limited, the charging current is limited to a magnitude equal or less than a current that discharges one of the at least one of a cell in a series circuit, a cell set in a series circuit and a cell pack in a series circuit.

10. The rechargeable battery system of claim 1 or 2, wherein
the controlling means for controlling the rechargeable battery system is at least one of an integrated circuit and a printed circuit board.

11. The rechargeable battery system of claim 1 or 2, wherein
in (d), the preset system period of time for the charging current to the rechargeable battery system being limited is in the range of 0.5 to 1.5 hours.

12. A vehicle, comprising
an electric motor, and
the rechargeable battery system of claim 1 or 2 for providing electric energy to the electric motor.

13. A method of charging a rechargeable battery system having a plurality of cells and a charging means for charging the rechargeable battery system, comprising
providing a plurality of cells electrically connected to form a rechargeable battery system;
providing a self-discharge voltage measuring means for continually measuring a self-discharge voltage and a corresponding self-discharging means, both connected in parallel to at least one of a cell in a series circuit, a cell set in a series circuit and a cell pack in a series circuit;
providing an over-charge voltage measuring means for continually measuring an over-charge voltage across at least one of a cell in a series circuit, a cell set in a series circuit and a cell pack in a series circuit;
providing a charging means connected in series with the rechargeable battery system for charging all of the cells of the rechargeable battery system;
providing a system voltage measuring means for continually measuring a system voltage across the charging means;
providing a limiting means for limiting the charging of the rechargeable battery system;
providing a controlling means for controlling the rechargeable battery system;
beginning charging, and:
(a) during charging, if the self-discharge voltage measured by any one of the self-discharge voltage measuring means is ≧ a preset self-discharge voltage, then, operate the corresponding self-discharging means until the measured self-discharge voltage is less than the preset self-discharge voltage, then, stop operating the corresponding self-discharging means; and
(b) during charging, if any of the measured over-charge voltages is > a preset overcharge voltage, then, limit the charging current to the rechargeable battery system, then, when all the measured over-charge voltages are ≦ a preset first resume voltage, then, stop limiting the charging current to the rechargeable battery system; and
(c) during charging, if the measured system voltage is > a preset overall voltage, then, limit the charging current to the rechargeable battery system, then, when the measured system voltage is ≦ a preset second resume voltage, then, stop limiting the charging current to the rechargeable battery system; and
(d) during charging, if the period of time for the charging current to the rechargeable battery system being limited is > a preset system period of time, then, stop limiting the charging current to the rechargeable battery system.

14. The method of charging a rechargeable battery system of claim 13, wherein
in (a), when operating the self-discharging means until the measured self-discharge voltage is less than the preset self-discharge voltage, further operate the self-discharge means for a preset period of time.

15. The method of charging a rechargeable battery system of claim 14, wherein
the preset period of time is a period of time that provides a discharge of a preset percentage of a charge capacity of each of the at least one of a cell in a series circuit, a cell set in a series circuit and a cell pack in a series circuit.

16. The method of charging a rechargeable battery system of claim 15, wherein
the preset percentage of the charge capacity is in the range of 0.1 to 20.

17. The method of charging a rechargeable battery system of claim 13, wherein in (b) and (c), when the charging current to the rechargeable battery system is limited, the charging current is limited to zero.

18. The method of charging a rechargeable battery system of claim 13, wherein
in (b) and (c), when the charging current to the rechargeable battery system is limited, the charging current is limited to a magnitude equal or less than a current that discharges the at least one of a cell in a series circuit, a cell set in a series circuit and a cell pack in a series circuit.

19. The method of charging a rechargeable battery system of claim 13, wherein
in (d), the preset system period of time for the charging current to the rechargeable battery system being limited is in the range of 0.5 to 1.5 hours.

* * * * *